June 24, 1952 R. M. CAIN 2,601,501

AUTOMATIC DISK RECORDER AND PLAYBACK DEVICE

Filed Nov. 3, 1947 16 Sheets-Sheet 1

SCHEMATIC VIEW IN PERSPECTIVE OF ALL COMPONENT UNITS POSITION OF UNITS IN RELATION TO TURN TABLE SLIGHTLY CHANGED TO FACILITATE ILLUSTRATION.

UNITS IN "AT REST" POSITION.

INVENTOR.
ROBERT M. CAIN
BY
Ostrolenk & Faber
ATTORNEYS.

SCHEMATIC VIEW IN PERSPECTIVE. RECORD LOADING ARM HAVING PICKED UP THE TOP RECORD FROM THE STACK READY TO RAISE AND THEN MOVE LATERALLY.

SCHEMATIC VIEW IN PERSPECTIVE RECORD LOADING ARM APPROACHING TURN TABLE. (AS PER FIG. 2.)

INVENTOR.
ROBERT M. CAIN

BY Ostrolenk & Faber

ATTORNEYS.

June 24, 1952 R. M. CAIN 2,601,501

AUTOMATIC DISK RECORDER AND PLAYBACK DEVICE

Filed Nov. 3, 1947 16 Sheets-Sheet 3

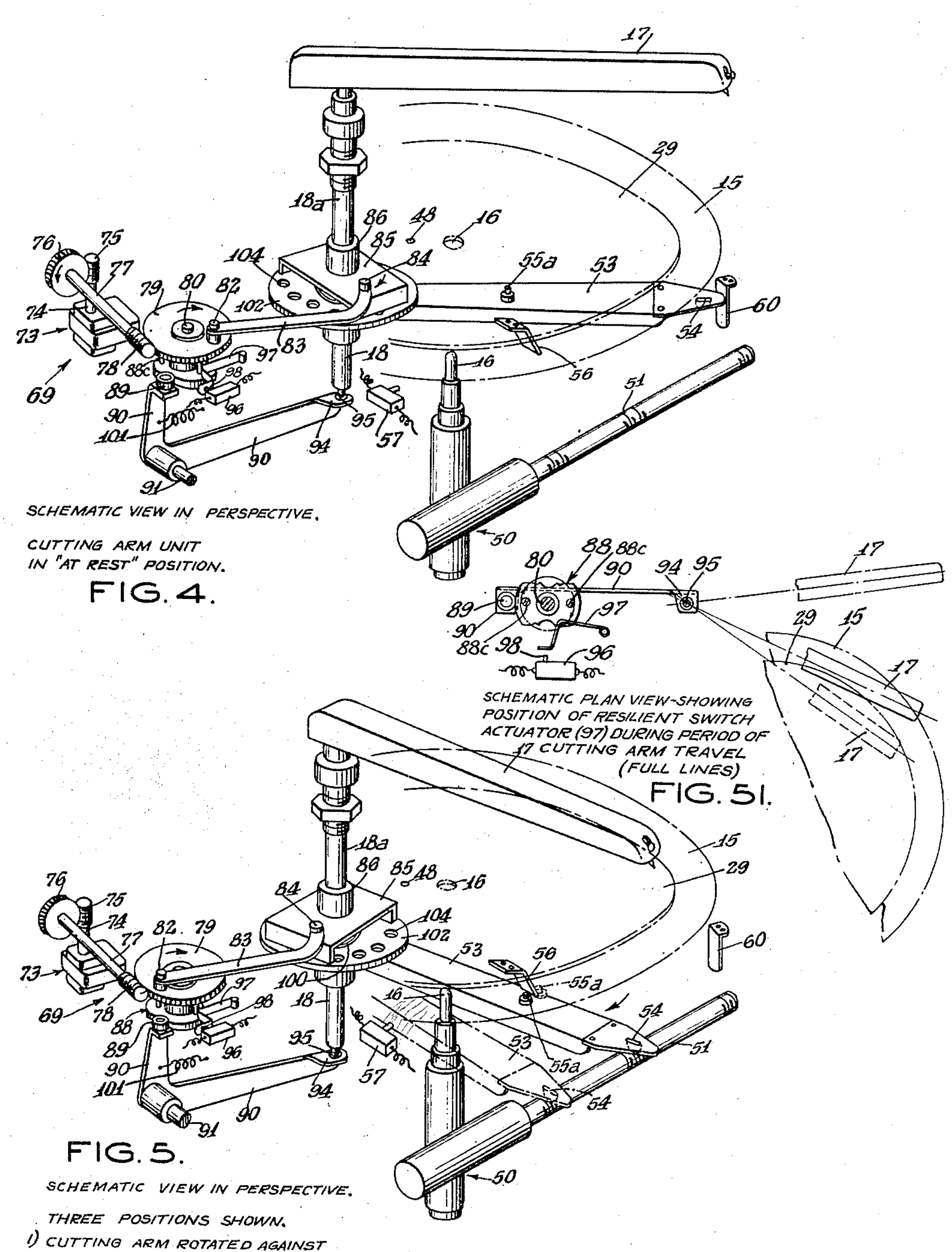
FIG. 4, FIG. 51, FIG. 5

SCHEMATIC VIEW IN PERSPECTIVE.
CUTTING ARM UNIT IN "AT REST" POSITION.
FIG. 4.

SCHEMATIC PLAN VIEW-SHOWING POSITION OF RESILIENT SWITCH ACTUATOR (97) DURING PERIOD OF 17 CUTTING ARM TRAVEL (FULL LINES)
FIG. 51.

FIG. 5.
SCHEMATIC VIEW IN PERSPECTIVE.
THREE POSITIONS SHOWN.
1) CUTTING ARM ROTATED AGAINST INDEX STOP. (PIN SHOWN IN DOTTED LINES)
2) CUTTING UNIT LOWERED CLEARING FIXED BRACKET. (AS PER FIG. 14)
3) DOT & DASH LINES POSITION OF SCREW-FEED ARM IN EXTREME "IN" POSITION ACTUATING SWITCH FOR NEXT POSITION (AS PER FIGS 32 & 33)

INVENTOR.
ROBERT M. CAIN
BY Ostrolenk & Faber
ATTORNEYS.

SCHEMATIC VIEW IN PERSPECTIVE
PLAY BACK ARM IN
"AT REST" POSITION

SCHEMATIC VIEW IN PERSPECTIVE
ILLUSTRATION OF PLAY BACK ARM DURING
"PLAY BACK" PERIOD

INVENTOR.
ROBERT M. CAIN
BY Ostrolenk & Faber
ATTORNEYS.

AUTOMATIC DISK RECORDER AND PLAYBACK DEVICE

Filed Nov. 3, 1947 16 Sheets-Sheet 5

SCHEMATIC VIEW IN PERSPECTIVE OF ELEVATING CAR WITH HEIGHT DETECTING SWITCH AND LIMIT SWITCH. REDUCTION OF "V" PULLEYS 1:100,000 FROM MOTOR.

SIDE VIEW OF ELEVATING CAR SHOWING LIMIT SWITCH ACTUATING.

INVENTOR.
ROBERT M. CAIN

BY
Ostrolenk & Faber
ATTORNEYS.

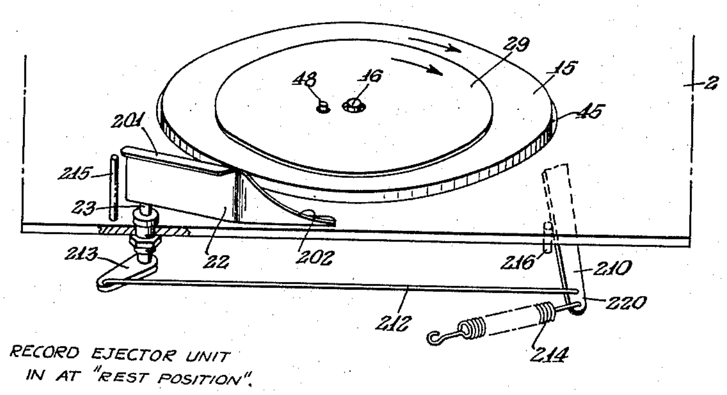
FIG. 11. RECORD EJECTOR UNIT IN AT "REST POSITION".
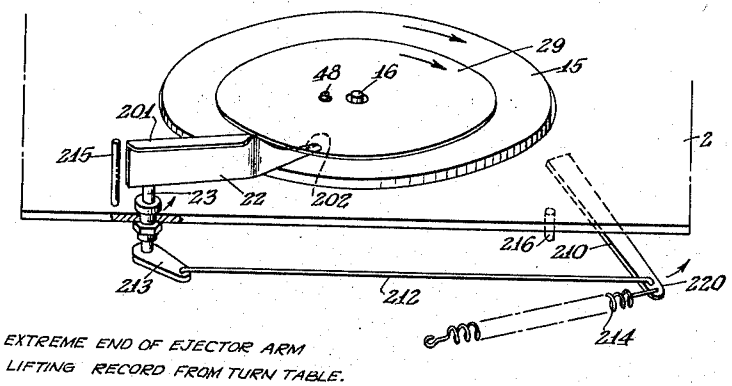
FIG. 12. EXTREME END OF EJECTOR ARM LIFTING RECORD FROM TURN TABLE.
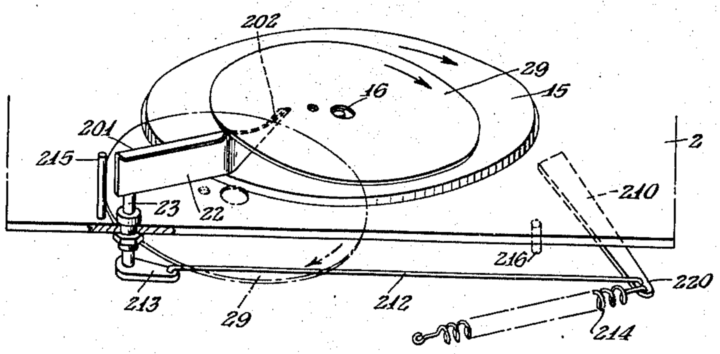
FIG. 13. RECORD COMPLETELY RELEASED FROM TURN TABLE & LOCKING PIN. DOT & DASH LINES SHOWING POSITION OF RECORD WHEN IT STRIKES STOP POST (215) ON ITS WAY AS IT IS THROWN OFF THE TURN TABLE.
INVENTOR.
ROBERT M. CAIN
BY
Ostrolenk & Faber
ATTORNEYS.

June 24, 1952 R. M. CAIN 2,601,501

AUTOMATIC DISK RECORDER AND PLAYBACK DEVICE

Filed Nov. 3, 1947 16 Sheets-Sheet 7

DETAIL SIDE VIEW PARTIALLY IN SECTION OF RECORDING UNIT

FIXED BRACKET.

DETAIL SIDE VIEW PARTIALLY IN SECTION OF PLAY BACK UNIT

INVENTOR.
ROBERT M. CAIN

BY Ostrolenk & Faber

ATTORNEYS.

INVENTOR.
ROBERT M. CAIN
BY
Ostrolenk & Faber
ATTORNEYS

INVENTOR.
ROBERT M. CAIN
BY Ostrolenk & Faber
ATTORNEYS

June 24, 1952 R. M. CAIN 2,601,501

AUTOMATIC DISK RECORDER AND PLAYBACK DEVICE

Filed Nov. 3, 1947 16 Sheets-Sheet 10

INVENTOR.
ROBERT M. CAIN
BY
Ostrolenk & Faber
ATTORNEYS

June 24, 1952 R. M. CAIN 2,601,501

AUTOMATIC DISK RECORDER AND PLAYBACK DEVICE

Filed Nov. 3, 1947 16 Sheets-Sheet 11

INVENTOR.
ROBERT M. CAIN
BY Ostrolenk & Faber
ATTORNEYS

INVENTOR.
ROBERT M. CAIN
BY Ostrolenk & Faber
ATTORNEYS

INVENTOR.
ROBERT M. CAIN
BY Ostrolenk & Faber
ATTORNEYS

AUTOMATIC DISK RECORDER AND PLAYBACK DEVICE

Filed Nov. 3, 1947 16 Sheets-Sheet 14

INVENTOR.
ROBERT M. CAIN
BY Ostrolenk & Faber
ATTORNEYS

June 24, 1952 R. M. CAIN 2,601,501

AUTOMATIC DISK RECORDER AND PLAYBACK DEVICE

Filed Nov. 3, 1947 16 Sheets-Sheet 15

INVENTOR.
ROBERT M. CAIN
BY
Ostrolenk & Faber
ATTORNEYS

INVENTOR
ROBERT M. CAIN
BY
Ostrolenk & Faber
ATTORNEYS

Patented June 24, 1952

2,601,501

UNITED STATES PATENT OFFICE 2,601,501

AUTOMATIC DISK RECORDER AND PLAYBACK DEVICE

Robert M. Cain, Charlotte, Mich., assignor to Wilcox-Gay Corporation, Charlotte, Mich., a corporation of Michigan Application November 3, 1947, Serial No. 783,668

23 Claims. (Cl. 274—10)

My invention relates to an automatic sound recorder and playback unit and more particularly relates to a device of the said character adapted to be operated by the insertion of a coin and so arranged that it will automatically make the record, play the record back and then deliver the record without any further operations of any kind on the part of the user.

In my application Serial No. 627,061, filed November 6, 1945, now Patent No. 2,584,257 and assigned to the assignee of the present invention, I have disclosed novel automatic means for moving a record cutting arm to the proper position on a record disc for initiating recording. This means is also operable on the termination of a recording to return the cutting arm back to the original position where it no longer extends above the record. This means also operates in conjunction with automatic means for starting the turntable and stopping the turntable.

In my aforesaid application, I have also disclosed that this automatic means is applicable as well to the operation of a playback arm, being adapted automatically to place the playback arm in the proper position for playing the record and to remove the playback arm from above the record at the termination of the recording.

My present automatic coin operated recorder and playback device utilizes the basic principle above described of the automatic means for placing the record cutting arm in position and starting the turntable and for removing the cutting arm from above the record at the termination of the recording.

This novel means is also applied equally to the subsequent placement of the playing arm on the record and also removes the playback arm from above the record at the termination of the playback.

This same type of novel automatic arm moving mechanism has also been applied by me to the arm hereinafter described which is utilized to take a blank record from a stack and place it on a turntable for recording purposes.

My invention contemplates a number of specific principal functions which must be performed by my novel device in order to produce a commercially practical result and a number of subsidiary functions which are necessary in order that the principal or primary functions operate properly:

1. A coin is dropped into a slot to close an appropriate circuit and initiate all of the following operations.

2. The record placing arm picks up a record from the top of a stack of records and brings the record over to a position above the turntable.

3. The record placing arm is then lowered until the record is on the turntable, whereupon the record placing arm is disengaged from the record.

4. The record placing arm returns to its original position above the stack of records.

5. The cutting arm which is at first located outside the periphery of the turntable is now lifted up and swung in towards the turntable to a position above and slightly inward of the outer edge of the record on the turntable.

6. The cutting arm is lowered so that the cutting stylus engages the record and the turntable is simultaneously caused to move. At the same time the cutting arm, when it is lowered, is engaged with feed means for moving the cutting arm slowly inwardly towards the center of the turntable in order to obtain a spiral cut.

7. At about the time the record is placed on the turntable (step 3 above) and before the stylus of the cutting arm engages the record on the turntable (step 6 above), the user picks up the microphone in order to be ready to start talking or singing into the microphone when the cutting stylus engages the record. As a practical matter, the user may even pick up the microphone before dropping the coin in the box, but the microphone should be picked up by this time at the latest.

8. As the record is cut, the user speaks or sings into the microphone while watching the cutting arm and stylus traverse the record.

9. The user is provided with a signal a short time before the completion of the record in order to warn him that the record is about to end.

10. At the completion of the record, the cutting arm is lifted up from above the turntable and rotated out beyond the periphery of the turntable.

11. The pick up arm which is located on the other side of the turntable from the cutting arm is now lifted up and brought over to a position where the pick up stylus is just above and slightly inward of the outer periphery of the record on the turntable.

12. The pick-up arm is then lowered into engagement with the record on the turntable and the record is played back.

13. After the recording operation is completed, and while the playback operation is being performed, the user replaces the microphone on its hook.

14. At the completion of the playback operation, the pick-up arm is lifted up once more above the record on the turntable and rotated outwardly beyond the periphery of the turntable.

15. Upon completion of the playback operation and as the pick-up arm moves back from above the turntable, a finger is moved in under one side of the record to lift up that side of the record.

16. Since the turntable is still rotating, the other side of the record opposite the finger is moved toward the front of the machine and around to the front of the finger by the motion of the turntable.

17. The above motion may be sufficient to deliver the record to the withdrawal slot where it may be obtained, but in the event it is not so delivered, the finger on its return movement pushes the record out.

18. The record is withdrawn from the withdrawal or delivery slot and the operation is completed.

There are a number of subsidiary operations which are, of course, performed in conjunction with the main operations or to make the main operations possible.

Thus, (*a*) the record stack is so arranged that the records in the stack will be fed upwardly automatically so that the record at the top of the stack will always be in a position to be engaged by the record placing arm.

(*b*) The amplifier is turned on by relay means at the time the coin is dropped. The cutter is always connected to the cutter circuit and the playback is always connected to the playback circuit. Each circuit is independent, and for the entire operation, the cutter and playback circuits are "on." Since the cutter cannot cut without being engaged with the record and the playback does not operate unless it is engaged, no actual switching is required.

(*c*) The playback arm actuating means serves on the return stroke to actuate the record delivery means which includes the finger above set forth.

(*d*) A series of signals in the form of lights or sounds may be provided to guide the user as to what he should do at any particular time and to inform the user as to what is being done by the machine at any particular time.

Actually all of the above primary and subsidiary functions are directed to the performance of the following main functions on the dropping of a coin in a slot:

I. Automatically to make a recording.

II. Automatically to play back the record.

III. Automatically to deliver the record.

The primary object of my invention therefore is the provision of novel mechanism and means for automatically making, playing back, and delivering records.

As a corollary object of my invention, the foregoing functions are to be performed automatically on the insertion of a coin in a slot or by other simple actuation of the mechanism in which the operator or user need merely drop a coin or press a button, close a switch or perform some similar simple single function to set in motion the whole train of events which results in the making, playing back and delivering of a record.

Other and more specific objects of my invention include novel mechanism and means for placing records on a turntable, removing records from a turntable, placing and removing a cutting arm with respect to a record on a turntable, placing and removing a pick-up arm with respect to a record on a turntable and various automatically operated switching devices which cause all of the foregoing operations to occur in proper predetermined sequence.

The foregoing and many other objects of my invention will become apparent in the following description and drawings, in which:

Figure 1 is a schematic view in perspective of all the component units of my novel automatic coin operated recorder and playback device with a position of the units with respect to the turntable slightly altered in order to facilitate the schematic illustration. There are schematically shown here the record stacking device and elevating mechanism, the record loading arm unit, the cutting arm feed mechanism, the playback arm unit, and the record ejecting mechanism.

Figure 4 is a schematic view in perspective showing the cutting arm and feed unit in the "at rest" position thereof.

Figure 5 is a schematic view in perspective illustrating the movement of the cutting arm unit.

Figure 11 is a schematic view in perspective of the record ejecting mechanism in the "at rest" position.

Figure 12 is a view corresponding to that of Figure 11 illustrating the initial phase of operation.

Figure 13 is a view corresponding to that of Figures 11 and 12 illustrating the final phase of operation of the record ejecting mechanism.

Figure 21:
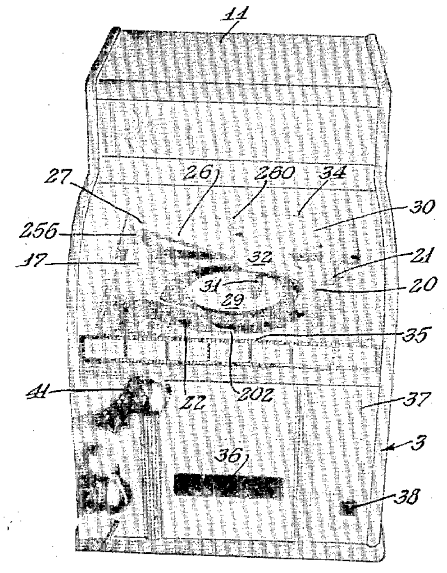

In Figure 21 I have shown a view of my device after the record has been placed on the turntable and the record placing arm is now returning to its original position. The record is on the spindle of the turntable, but the eccentric hole in the record is not necessarily in registry with the eccentric pin on the turntable. The microphone is at this time being removed by the user in order that he may begin to speak or sing into it as soon as the record cutting operation begins.

Figure 22:
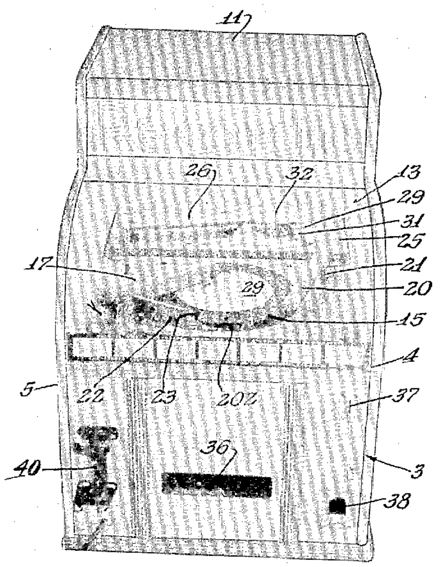

Figure 22 illustrates the next step in the operation in which the record cutting arm has been moved over to a position above the turntable, has been lowered so that the stylus engages the turntable and the cutting arm feeding means has been engaged. The record cutting operation has proceeded for a minute or so since the cutting stylus is at about the middle of the record. The rubber finger at the tip of the cutting arm is performing its operation of removing the shavings. As soon as the cutting stylus has engaged the record, it restrains the record until the eccentric pin on the turntable steps into the eccentric hole on the record whereupon the record rotates with the turntable.

Figure 23:
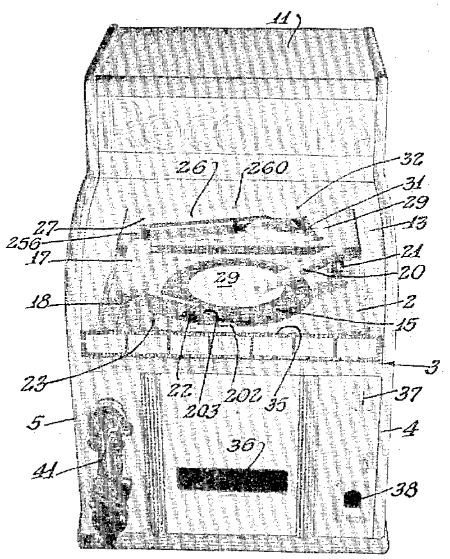

Figure 23 is a view showing the condition of the apparatus after the record has been made and while the record is being played back. The pick-up arm is here in position on the record while the record is being rotated by the turntable. The microphone has been replaced since it is no longer used. The unit is so constructed that if privacy is desired during playback, the handset is used as a normal telephone and the sound comes from the ear piece; however, when the handset is hung up on the hook, switching means in conjunction with the hook disconnects the handset and connects the loud speaker.

Figure 24:
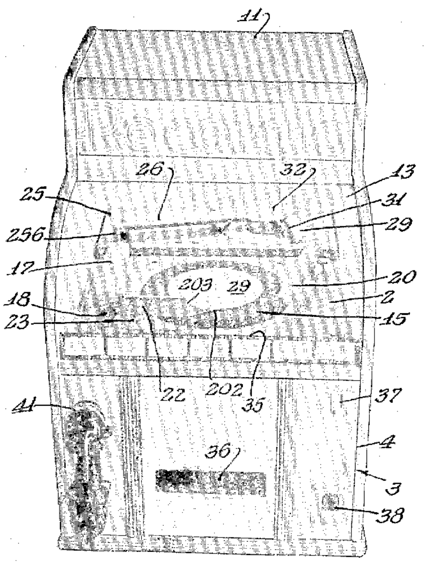

Figure 24 is a view taken immediately after completion of the playback operation; the pick up arm as it moves back has caused the record ejecting finger to move back on one side of the record.

Figure 25:
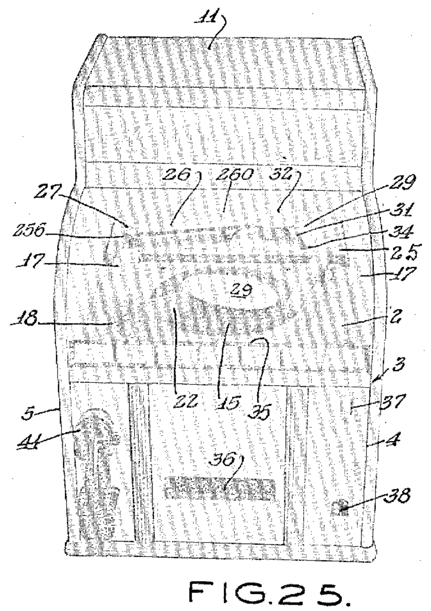

Figure 25 is a view showing another step in the record ejecting operation. The ejecting finger has lifted up one side of the record so that the turntable which is rotating clockwise with respect to Figure 25 is moving the other side of the record forward towards the delivery slot.

Figure 26:
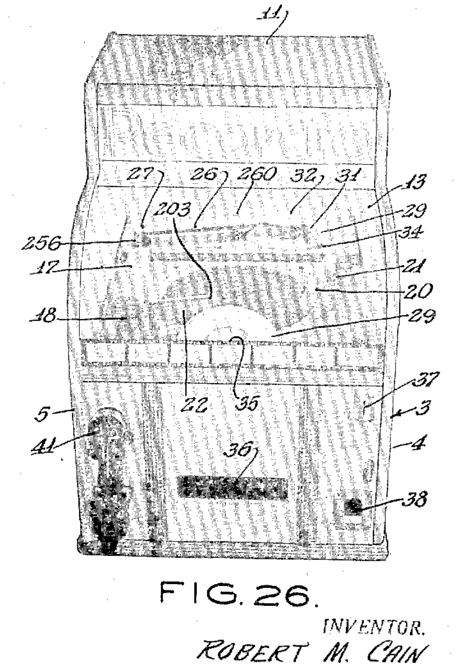

Figure 26 is a view showing the final step in the record ejecting operation wherein the record has been moved by the turntable up to the delivery slot and the ejecting finger is now moving back, pushing the record into the slot.

Figure 27:
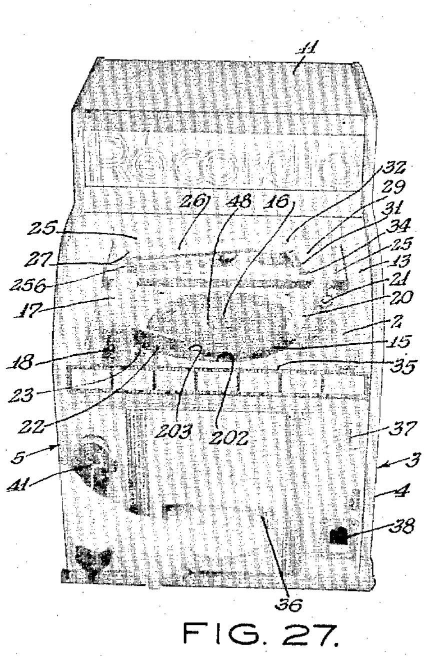

Figure 27 is a view showing the final operation in which the record on which a recording has been made and played back is now removed from the delivery slot.

Figure 28:
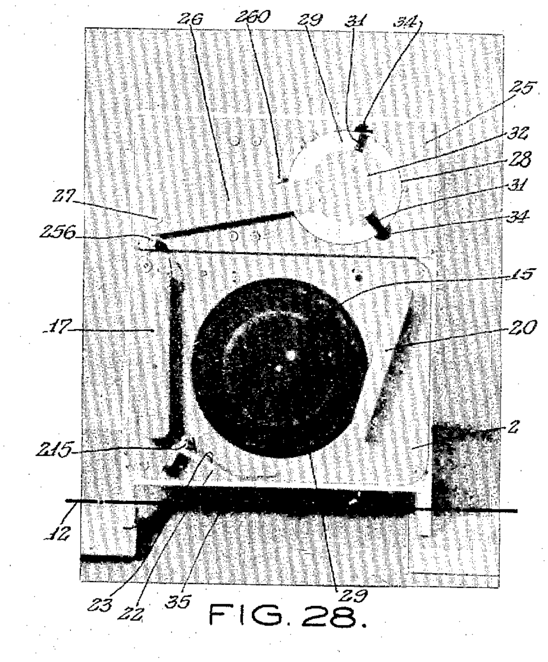

Figure 28 is a plan view of my novel coin operated recorder with the cabinet removed and showing also the reserve record stack. This is so arranged that when the records are at the proper height, switch means permit the coin to be inserted and to operate. If the record stack is not at the proper height, the switch means disables the coin chute, the recorder is not operated, and the coin is returned.

Figure 29:
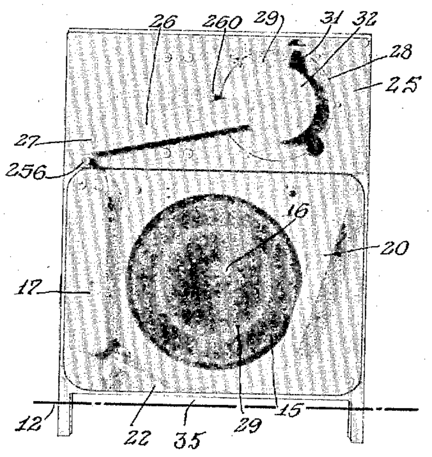

In Figure 29 I have shown a plan view corresponding to that of Figure 28, but showing the record reserve support empty. Other switch means hereinafter described provide not only for disabling the coin chute so that coins dropped therein are returned, but also stops the record stack elevator motor when the record stack elevator reaches its upper limit.

Figure 1:
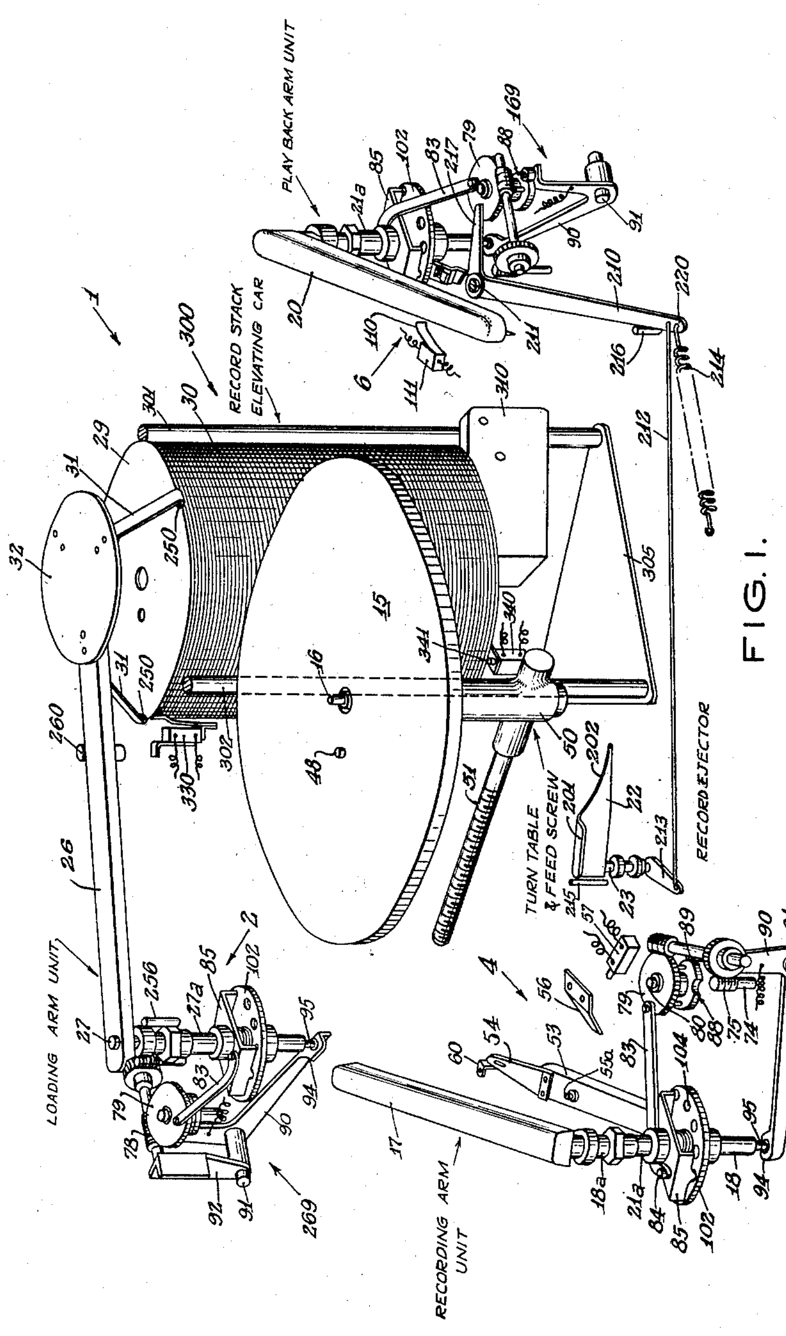
Figure 19:
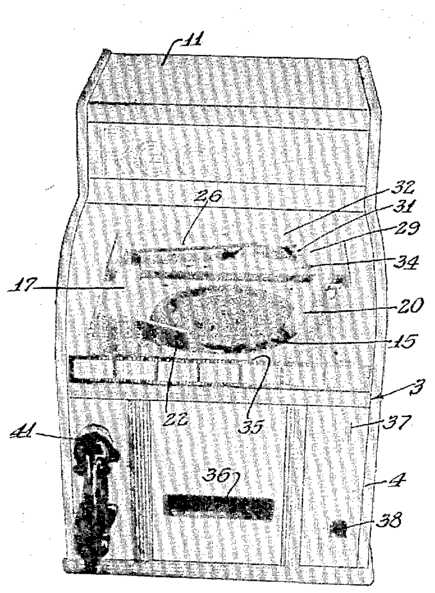
Figure 19 is a view of my novel recorder with all of the elements at rest and before a coin has been dropped into the slot.
Figure 30:
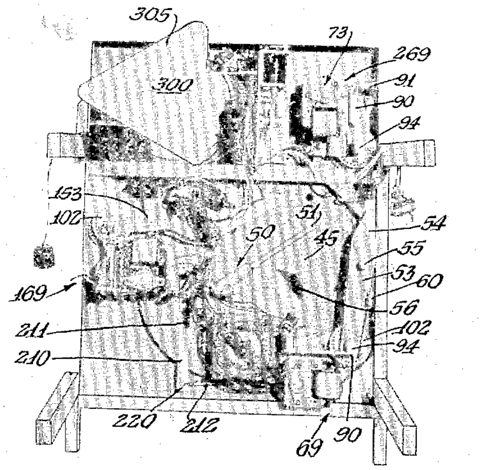

Figure 30 is a view of the under side of my novel recording apparatus with the cabinet removed, showing all parts in the "at rest" position corresponding to Figures 1, 19 and 27.

Figure 31:
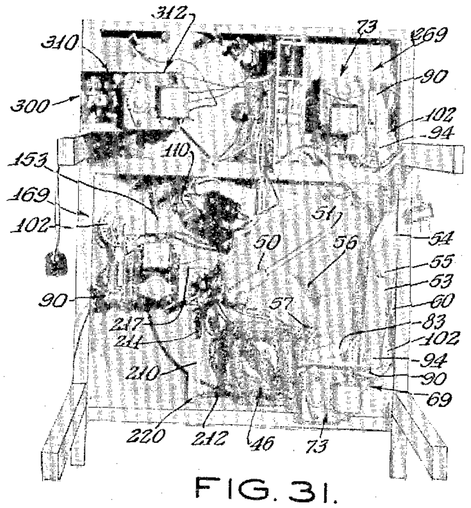

Figure 31 is a view of the underside of the coin operated recorder corresponding to the view of Figure 30 with the triangular frame member at the lower end of the record stack removed to show the under side of the record elevating car and the record stack operating means.

Figure 32:
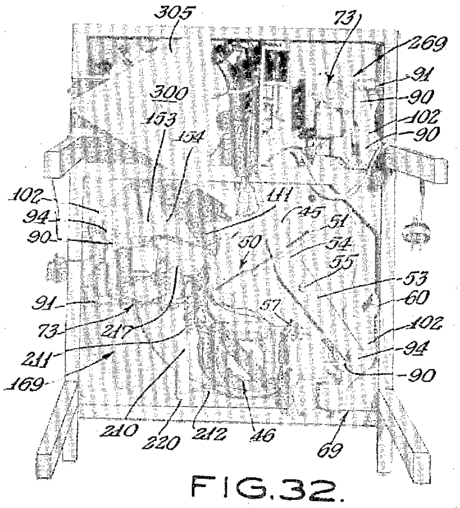

Figure 32 is a view corresponding to those of Figures 30 and 31, showing the under side of the recorder. This view corresponds substantially to the condition of the elements just prior to that shown in Figure 22 in which the cutting arm has been moved to the initial position for beginning a recording. The feed pawl or arm for the cutting arm is shown engaging the feed screw in order to feed the cutting arm inwardly to make a record.

Figure 33:
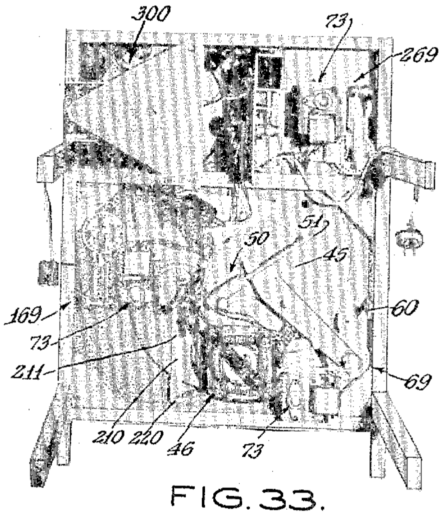

Figure 33 is a view corresponding to that of Figure 32 showing, however, the feed pawl or follower arm in the extreme inward position to actuate the switch which starts the next function, that is, the return of the cutting arm and the placement of the pick up arm.

Figure 34:
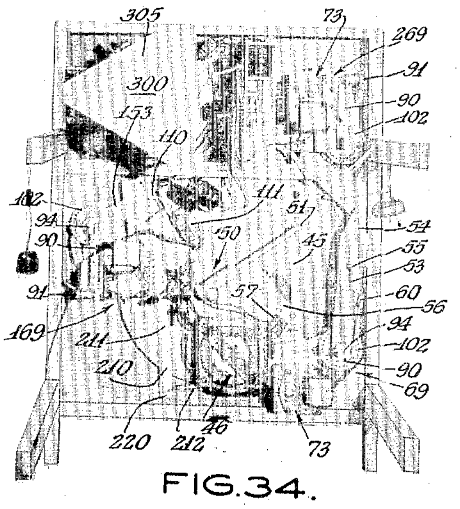

Figure 34 is a view of the under side of my novel automatic coin operated recorder showing the cutting arm returned to its original position and showing the index bracket carried by the playback arm rotated so that the play back arm is indexed over the edge of the record.

Figure 35:
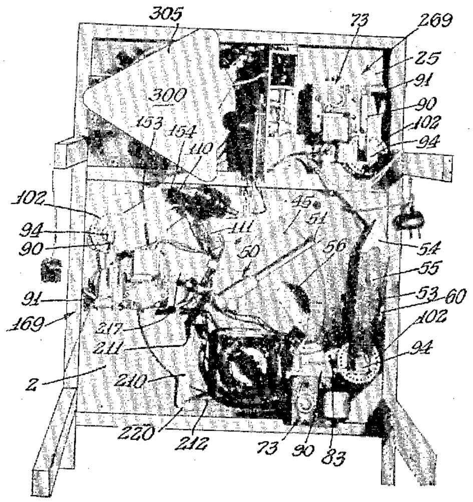

Figure 35 is a view corresponding to that of Figure 34 showing, however, the indexing bracket carried by the playback arm rotated so that it has closed the switch.

Figure 36:
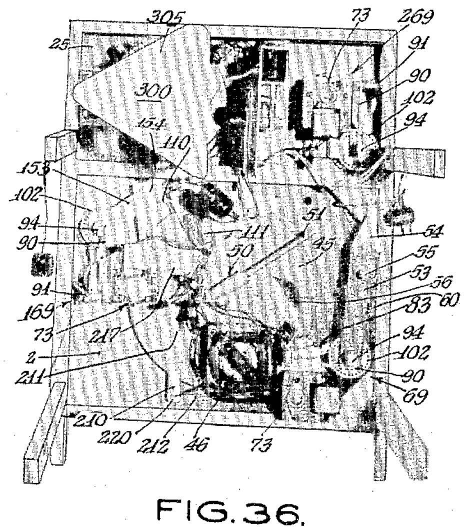

Figure 36 corresponds to Figures 34 and 35, showing however, the playback arm indexing bracket further rotated to cause the switch actuator to drop off the point of the bracket, thus opening the switch.

Figure 37:
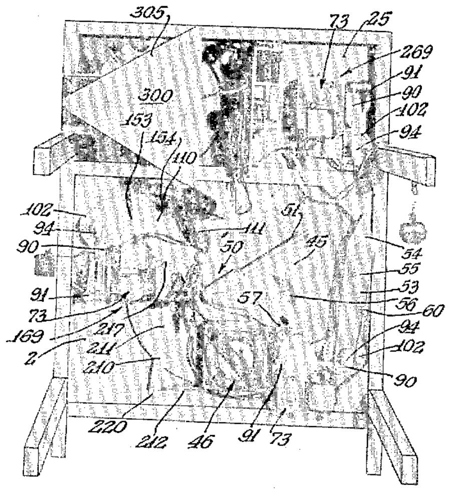

Figure 37 corresponds to Figures 34, 35 and 36, showing however the playback arm indexing bracket returned and actuating the record ejecting mechanism.

Figure 38:
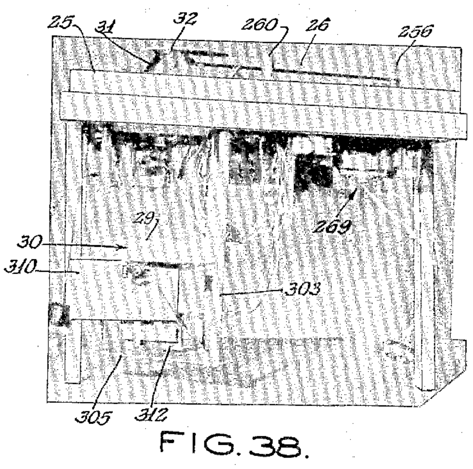

Figure 38 is a rear view of my novel coin operated recorder with the cabinet removed, showing the record stack elevator car and the stepping switches.

Figure 39:
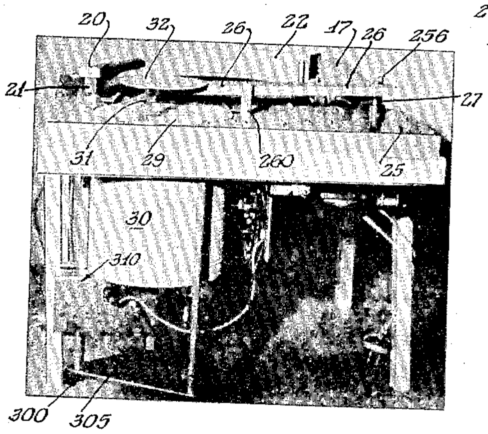

Figure 39 is a view corresponding to that of Figure 38 showing the record supply carried by the record elevator car.

Figure 40:
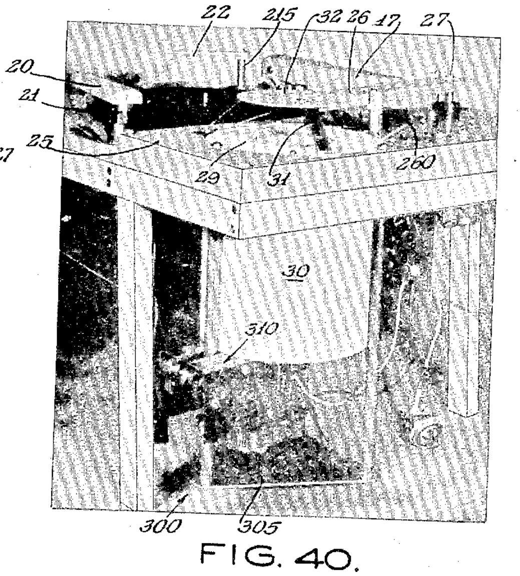

Figure 40 is a view of my novel recorder showing the record loading arm in the "at rest" position.

Figure 41:
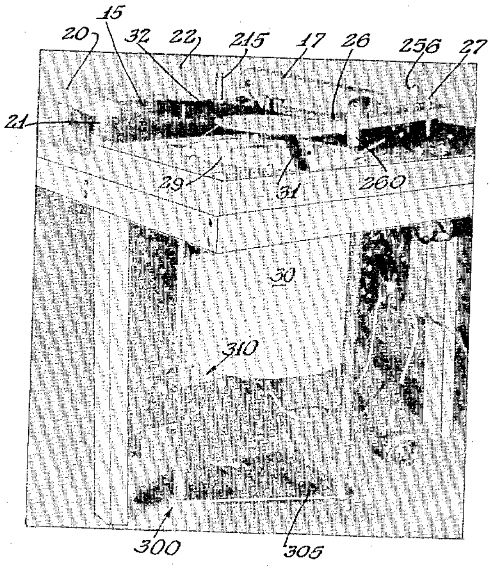

Figure 41 is a view corresponding to that of Figure 40 showing the record loading arm moving down to engage the top record in the stack.

Figure 42:
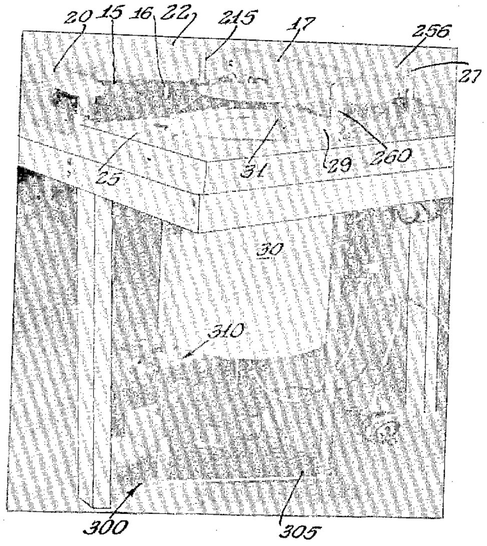

Figure 42 is a view corresponding to those of Figures 40 and 41 showing the manner in which the record loading arm picks up the top record from the stack.

Figures 43, 44:
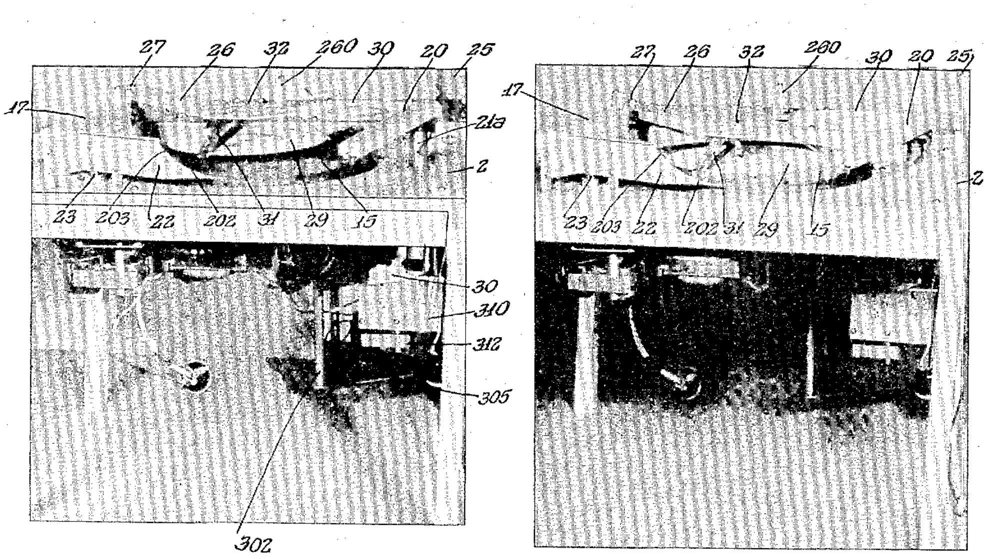

Figure 43 is a detailed view of my novel coin operated recorder showing the manner in which the record loading arm places a record on the turntable.

Figure 44 is a view corresponding to that of Figure 43 showing the manner in which a record is released from the record loading arm after being placed on the turntable.

Figure 45:
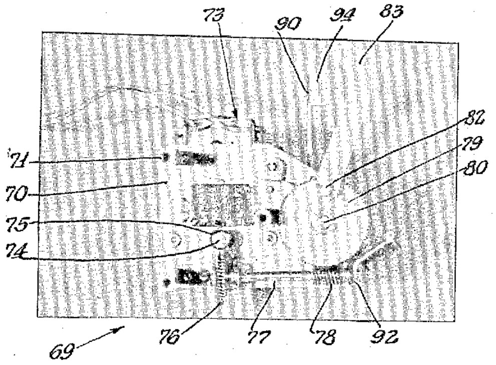

Figure 45 is a view in detail of the operating means, three sets of which are utilized, one for the record cutter, one for the playback arm, and one for the record loading arm.

Figure 46:
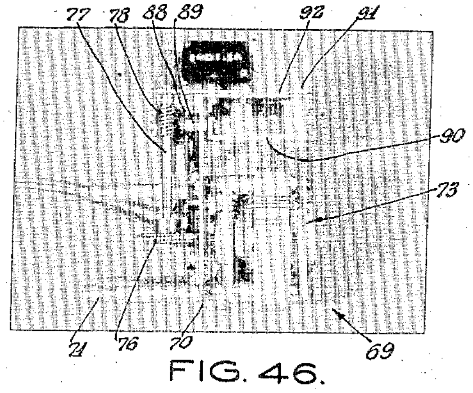

Figure 46 is a side view of the operating unit of Figure 45.

Figure 47:
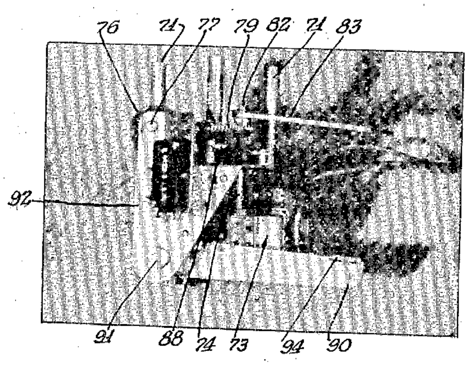

Figure 47 is an end view of the operating unit of Figure 45.

Figure 48:
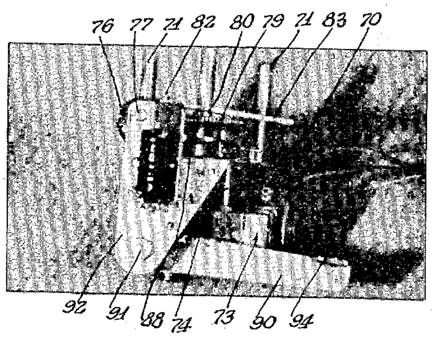

Figure 48 is a view corresponding to that of

Figure 47 showing the operating element rotated through 180° to move the connecting link.

Figure 49:
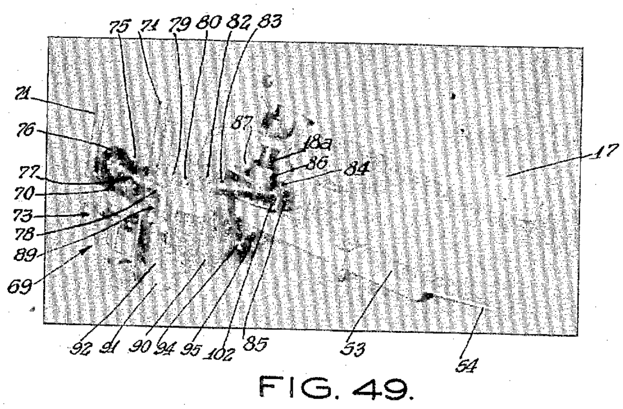

Figure 49 is a view in perspective showing the manner of attachment of the operating unit of Figures 45 to 48 to actuate the cutting arm.

Figure 50:
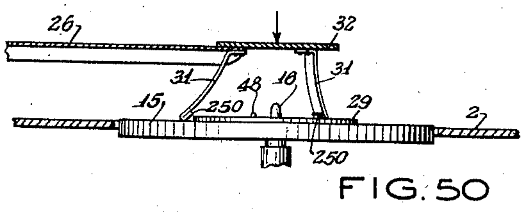

Figure 50 is a side view partly in cross section showing the manner in which the record loading arm releases the record on the turntable.

Figure 51 is a schematic plan view partly in cross section showing the period of cutting arm travel from the position of Figure 4 and the position of Figure 5.

Figures 14, 15, 16, 52:
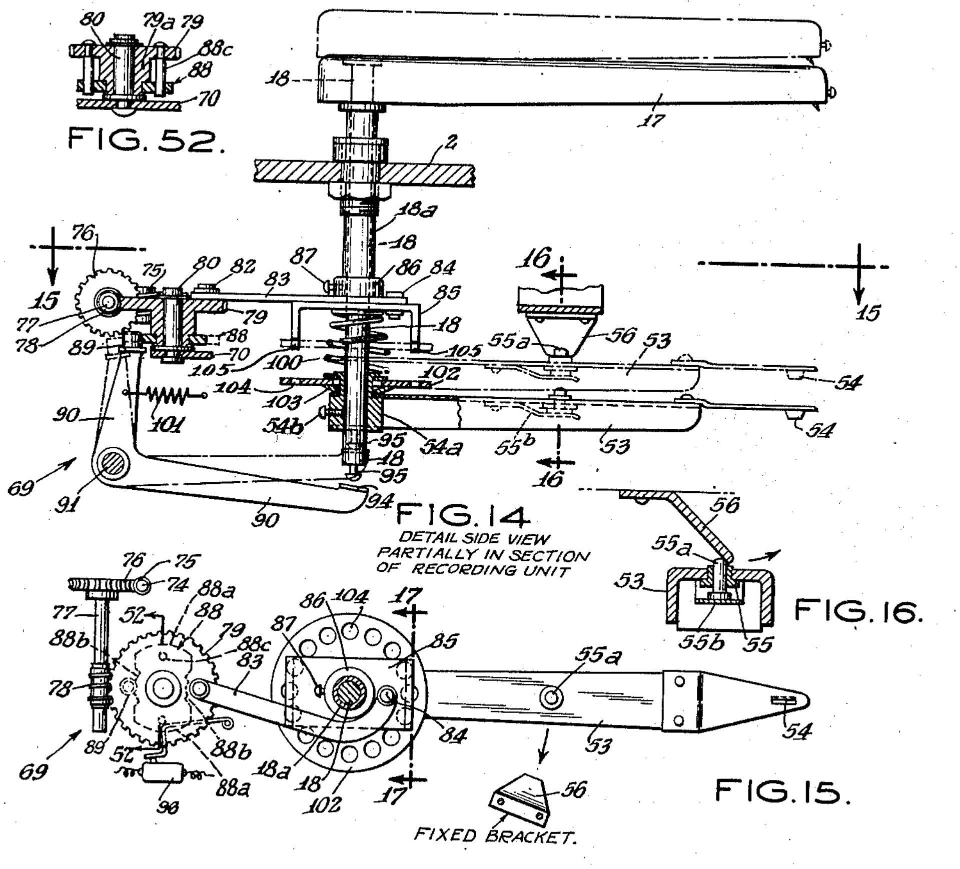
Figure 14 is a detailed side view of the record cutting unit.
Figure 15 is a top view taken from line 15—15 of Figure 14 looking in the direction of the arrows.
Figure 16 is a detailed cross sectional view taken from line 16—16 of Figure 14.

Figure 52 is an enlarged detail of a portion of Figures 14 and 15 a cross-sectional view on line 52—52 of Figure 15.

Figure 53:
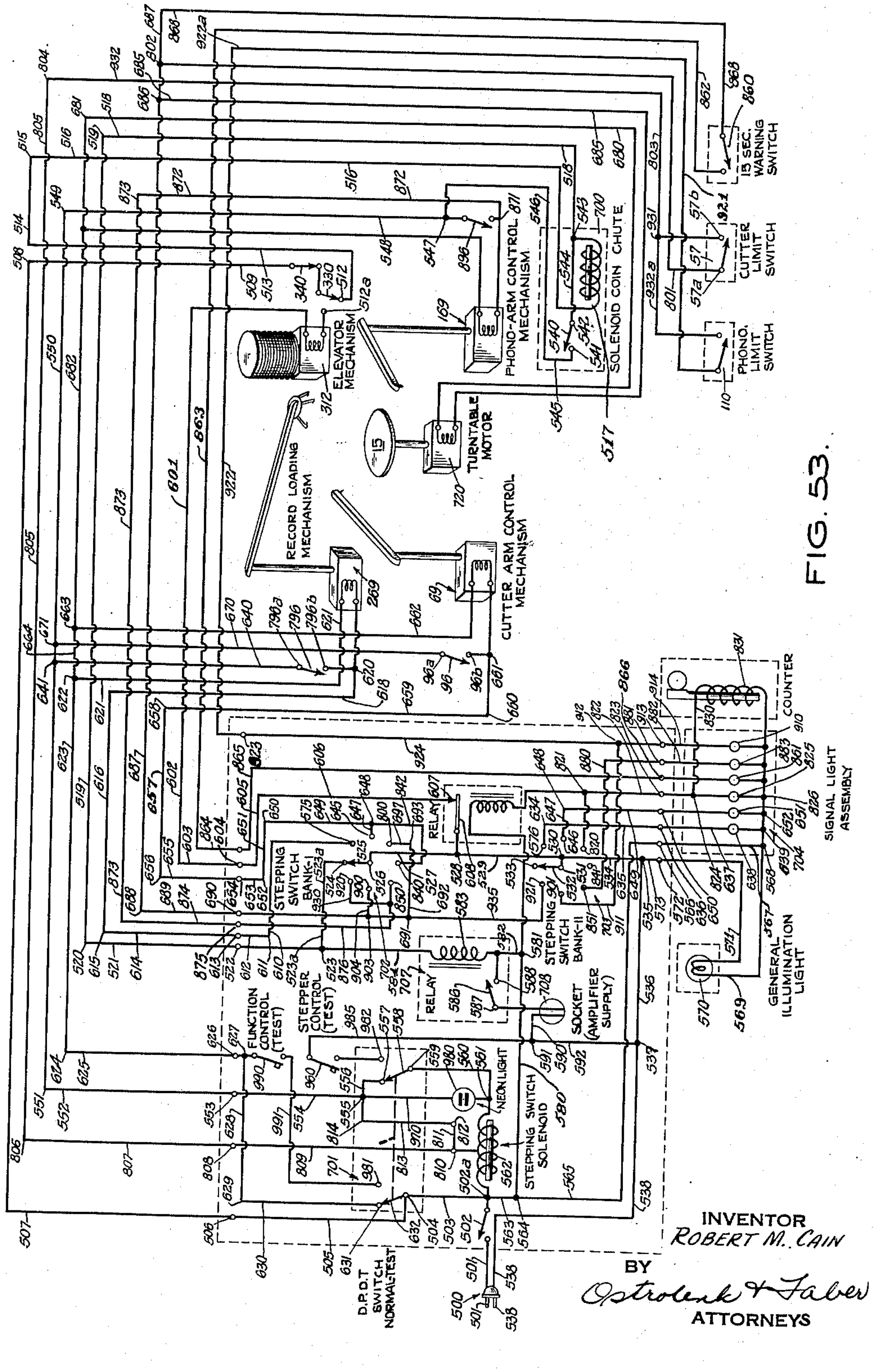

Figure 53 is a schematic view illustrating the circuit for interconnecting and operating all elements sequentially.

Referring especially to Figure 1 and also to Figures 19 to 29, my novel automatic coin operated recorder 1 comprises a principal base member 2 enclosed in a cabinet 3 having side walls 4 and 5, top wall, and a front wall 12. The front wall is preferably provided with a transparent window 13 through which the base member 2 and the operating elements thereon are visible.

The base plate 2 carries a rotatable turntable 15 which operates on the spindle 16 and also carries the cutting arm 17 rotatably mounted on the post 18 located at the front of the machine on the left hand side of the turntable.

Base plate 2 also carries a pick up arm 20 rotatably mounted on the post 21 at the rear of the machine on the right hand side of the turntable. The record ejecting finger 22 is mounted at the front of the machine on post 23 at the left hand side of the turntable.

Base plate 2 is located substantially at the front of the machine. An additional base plate 25 is located at the rear of the machine, slightly above the level of base plate 2. The additional base plate 25 carries the record loading arm 26 pivotally mounted on post 27. Base plate 25 is provided with an opening 28 to permit the uppermost record 29 in the record stack 30 to be accessible to the record lifting fingers 31 at the loading end 32 of the record loading arm 26.

The opening 28 is provided with recesses or notches 34 with which the ends of the record loading fingers 31 register in order to engage the uppermost record 29 of the stack 30 in the manner hereinafter pointed out.

The front end of the base plate 2 is spaced from the front wall 12 of the cabinet as indicated in Figures 26 and 28 by a sufficient distance to permit a record to be pushed off the base plate 2 and into the slot 35 formed between the front end of base plate 2 and the front wall 12 of the cabinet.

The front wall 12 of the cabinet is provided with a slot 36 communicating with the opening 35 above referred to so that the record may be withdrawn as shown in Figure 27 after the same has been delivered.

Front wall 12 is also provided with a coin slot 37 and coin return chute 38 to coact with the coin apparatus hereinafter described.

The front wall 12 is also provided with appropriate support means such as the hook 40 shown in Figure 22 for the microphone 41.

The various elements and operations of my novel coin operated automatic recorder and playback device will now be more specifically described in terms of individual elements which are set forth not necessarily in their order of operation but rather in the order in which it may be simplest to follow the successive operations.

*Turntable operation*

The turntable 15 is operated in the manner substantially identical to that shown in Patent No. 2,351,948, assigned to the assignee of the present invention, although the operative elements will preferably have various improvements incorporated therewith such as those shown in applications Serial No. 676,777, filed June 14, 1946, now Patent No. 2,478,234, and Serial No. 731,319, filed February 27, 1947, and assigned to the assignee of the present invention. Any suitable means may, however, be utilized for operating the turntable.

Thus in Figures 30 to 37 which show the underside of the base plate 2, it will be noted that the turntable 15 operates in a circular recess or depression 45 of the base plate 2. A motor 46 is secured to the under side of recess 45. This motor is the turntable drive and is used entirely to drive the turntable although it drives the cutting arm indirectly.

Preferably the shaft of motor 46 extends upwardly and through an opening in recess 45 where the shaft engages a rubber rimmed idler which in turn bears against the dependent annular flange of turntable 15 to drive the turntable.

This particular drive is not shown specifically here since its basic principle is disclosed in the patent and application above set forth.

Similarly, motor 46 is preferably mounted in rubber grommets in the manner described in Patent 2,351,948 in order to eliminate wows arising from power surges as more fully described in the above mentioned patent.

Also the turntable 15 is provided with the eccentric pin 48 as may readily be seen in Figures 1 and 28 to engage a similar eccentric opening in the record in order to ensure that the record will rotate with the turntable despite the load of the cutting stylus thereon. This eccentric pin operates through an opening in the turntable by a spring biased to the raised position and is exactly similar to the eccentric pin and turntable disclosed in the above mentioned patent.

*Cutting arm operation*

The cutting arm operates substantially in the manner disclosed in Patent No. 2,351,948 and also in application Serial No. 676,777, filed June 14, 1946.

The turntable 15 which is rotated by the motor 46 in the manner above described drives the spindle 16. Spindle 16 drives the screw 51 through the gear box 50 (Figures 1, 4, 5, 16 and also Figures 30 to 37). The post 18 of the cutting arm 17 extends down below the base plate 2 and carries the follower arm 53 secured thereto. The outer end of the follower arm 53 carries the knife edge pawl 54. When the cutting arm is lifted from the position shown in Figures 1, 4 and 21, and then rotated inwardly, the knife edge pawl 54 on the follower arm 53 is correspondingly moved inwardly from the position shown in Figures 1, 4, 30 and 31 to the position shown in Figures 5 and 32. When the appropriate indexed position is reached for the stylus above the outer margin of the record, the recording arm 53 is lowered so that the stylus on the follower arm engages the record on the turntable and so that the knife edge pawl 54 engages the screw 51.

The follower arm 53 is indexed during its rotation from the position in Figures 1, 4 and 31 to the position in Figures 5 and 32, so that it will halt with the cutting stylus at the right position above the outer margin of the record, by a vertically resilient pin 55a (Figures 4, 5, 14, 16, 49) carried in the bushing 55 (Figures 16 and 32) at about the center of the follower arm 53. Pin 55a is biased upwardly by leaf spring 55b.

In the raised position of the follower arm and the cutting arm, while the cutting arm is being moved inwardly towards the periphery of the record, pin 55a will strike the dependent bracket 56 secured to the underside of recess 45 of base plate 2. This will halt the inward movement of the follower arm and the cutting arm at the predetermined position as shown in Figures 5 and 32 until the operating mechanism 69 for moving the cutting arm 17 inwardly has ceased its operation and the cutting arm 17 and follower arm 53 have been lowered so that the cutting stylus engages the record.

At this time, the upper end of the pin 55a will move below the lower end of bracket 56 so that the follower arm 53 may be rotated inwardly by the interaction of screw 51 and knife edge pawl 54 until the extreme inward position of Figure 33 is reached. When this extreme inward position is reached and the recording is completed, the follower arm 53 engages the switch 57 to close the same to energize the operating mechanism for raising the follower arm 53 and cutting arm 17 and for moving these members outwardly beyond the periphery of the turntable 15 to the position of Figures 1, 4, and 34.

The operation of switch 57 will through the stepping mechanism described below energize the pick-up arm operating mechanism 169 hereinafter described to move the pick-up arm into position to play back the record after the cutting arm has returned to nonrecording position.

*Operating mechanism for cutting arm*

This mechanism is identical except for slight adaptation with the operating mechanism for the playback arm and record loading arm.

The operating means for lifting the follower arm 53 and the cutting arm 17 and for moving the same inwardly to the position shown in Figures 5 and 33 and for moving the same outwardly from the position shown in Figures 5 and 33 to the position shown in Figures 4 and 34 is more specifically described in connection with Figures 45 to 49 inclusive, as well as in connection with Figures 1, 4, 5, 14, 15 and 17 and also 52.

It will be obvious that during the return stroke or outward movement of follower arm 53 and cutting arm 17, the bracket 56 is so inclined that pin 55a will be depressed as it moves past the bracket 56 so that bracket 56 will not interfere with the outward or return movement of the cutting arm away from the record.

The complete outward position of the cutting arm is established by the dependent vertical bracket 60 (Figures 1, 32 and 34) which is engaged by the follower arm 53 on completion of its outward movement. It will be obvious that in order to permit the follower arm 53 and cutting arm 17 to be held at the indexed position, the drive element should include a frictional member. Essentially this drive element is the same as that described in application Serial No. 676,777, filed June 14, 1946, above mentioned.

This drive element comprises a supporting frame 70 (Figures 45 to 49) which is secured to the under side of base plate 2 by appropriate screws which enter into the bushings 71. A motor 73 supported by the plate 70 drives the vertical shaft 74 (see also Figures 1, 4, 5, 14 and 15) to the upper end of which is secured the worm 75. The worm 75 drives the spiral gear 76 on shaft 77. Shaft 77 carries the worm 78 which in turn drives the spiral gear 79 which rotates on shaft 80 carried by frame 70. Spiral gear 79 carries at its outer periphery the vertical pin 82 which in connected by the link 83 to the pin 84 on the U-shaped bracket 85 which is secured by collar 86 and set screw 87 to sleeve 18a. The U-shaped bracket is rotatable on collar 86 but is not movable vertically. The post 18 is rotatable and slidable vertically in sleeve 18a. Thus, the bracket 85 is arranged for rotation in a plane of fixed elevation whereas the post 18 is arranged for sliding and rotational movement.

The shaft 80 for spiral gear 79 is rigidly supported by a portion of frame 70 through which the shaft 80 passes. Gear 79 is rotatable on shaft 80. The hub 79a (Figure 52) carries cam 88 which is also connected to gear 79 by pins 88c which act as switch operators. The shape of cam 88 is more readily seen in Figure 15 wherein it will be noted that the cam 88 has two extended portions 88a and two depressed portions 88b, similar portions being diametrically opposite to each other.

When the spiral gear 79 is rotated in the manner previously described it not only moves the link 83 but at the same time rotates the cam 88.

Cam follower 89 at the upper end of arm 90 is moved by the cam 88 in accordance with the angular position of the cam 88. Arm 90 is a bell crank lever which is pivoted on pin 91 secured to bracket 92 of the frame 70. When the extension portions 88a of cam 88 move opposite the cam follower 89, then the bell crank lever or arm 90 is raised from the solid line position of Figure 14 to the dotted line position of Figure 14, raising the platform 94 at the end of the arm 90 opposite the cam follower 89.

Platform 94 moves upward against the downwardly projecting pin 95 extending from the lower end of post 18. This thereby lifts the post 18 and hence lifts the cutting arm 17 from the position shown in Figures 1 and 5 to the dotted line position of Figure 14 and the solid line position of Figure 4. In Figure 5, the apparatus is shown during the actual cutting of the record with the cutting arm 17, the post 18 and the platform 94 of bell crank lever 90 in the lowered position.

It will here be seen that cam section 88b is opposite the cam follower 89. When, however, the post 18 and cutting arm 17 are raised, this is a result of the opposition of the contact of cam section 88a with the follower 89. As above noted, there are two depressed cam sections 88b and two raised cam sections 88a. The full operation of the cutting arm is performed in two separate half cycles with an intermediate cutting cycle, that is the cutting arm 17 and post 18 are raised first, and then rotated into a position where the cutting stylus is above and slightly inward of the outer margin of the record.

The cutting arm 17 and the post 18 are then lowered into engagement with the record. This is the first half cycle of operation. The feed screw 51 cooperating with the pawl 54 and follower arm 53 now causes the cutting arm 17 to traverse the record slowly for the cutting operation. At the completion of the cutting operation, the post 18 and cutting arm 17 are again raised but this time rotated outwardly beyond the outer margin of the turntable whereupon the post 18 and cutting arm 17 are lowered.

Thus the apparatus starts in the position shown in Figure 15. During the first half cycle, the spiral gear 79 rotates in a clockwise direction, pulling the link 83 to the left. The cooperation of the link 83, pin 84, and bracket 85 will be described below.

During this clockwise rotation, the lower extended section 88*a* of the cam 88 moves opposite the cam follower 89, moving the cam follower 89 to the left and raising post 18 and cutting arm 17 as above described.

On completion of the first inward movement of the cutting arm 17, the cutting arm 17 is held in position just inward of the outer margin of the record, by the cooperation of pin 55*a* and bracket 56 as previously described.

The connecting drive between bracket 85 and the cutting arm is a frictional one as described below so that even though the cutting arm 17 is held against further inward rotation while the extended portion 88*a* of cam 88 is against the follower 89, the cutting arm 17 and post 18 are maintained in elevated position until the opposite depression 88*b* moves opposite the cam follower at the end of 180° of rotation of cam 88 and spiral gear 79.

At this time, the cutting arm 17 and post 18 are lowered first by their own weight and assisted by the compression spring 100.

The bell crank lever 90 and cam follower 89 are maintained in position wherein cam follower 89 always engages the surface of the cam by the tension spring 101. The apparatus is now in the position shown in Figure 5 and in the solid lines of Figure 14. On completion of the record cutting cycle, the spiral gear 79 and cam 88 are once more actuated to continue another 180° of clockwise rotation with respect to Figure 15. This now results in raising the cutting arm 17 and post 18 once more and then in moving cutting arm 17 and post 18 outwardly until the full second 180° rotation of cam 88 is completed, whereupon the post 18 and cutting arm 17 are lowered by their own weight and also with the assistance of the compression spring 100.

It should here be pointed out that in all of the foregoing operations, no rotation of the post 18 or of the cutting arm 17 can occur until the post 18 and the cutting arm have been raised. Consequently, although the bracket 85 is rotated first in one direction and then in another by link 83 connected to spiral gear 79, this rotative motion occurs in each case only after the cutting arm 17 has been raised to clear the record.

The hub 54*a* of post 18 has rotatably mounted thereon the clutch disk 102. Between the clutch disk 102 and the upper surface of the portion of the follower arm 53 which is connected to the post 18 is mounted a spring friction washer 103.

The compression spring 100 is mounted between the underside of bracket 85 which is attached to the sleeve 18*a* and the upper surface of the hub 54*a* of arm 53 which is secured by screw 54*b* to post 18 and thereby biases post 18 downwardly.

When the post 18 and cutting arm 17 are raised from the solid line position of Figure 14 to the dotted line position of Figure 14, the clutch disk 102 which is provided with a plurality of holes 104 adjacent the periphery thereof is forced up against the bracket 85. The bracket 85 has a pair of opposed dependent relatively narrow extensions 105, the said extension being adapted to fit into holes 104. When the clutch disk 102 is thus forced up by the raising of post 18, and while bracket 85 is being rotated, the opposite dependent extensions 105 of bracket 85 snap into a pair of opposite holes 104 of the clutch disk 102 in order to rotate the clutch disk.

The assembly of friction clutch 102 and spring washer 103 creates a friction coupling between the disk 102 and arm 53 to rotate arm 53 and the post 18 to which it is attached.

Thus the friction drive connection between link 83 and bracket 85 and the post 18 in order to rotate post 18 is obtained only when the post 18 and its cutting arm 17 and follower arm 53 are raised to their fullest extent were the cutting stylus clears the upper surface of the record on the turntable and wherein the pawl 54 clears the feed screw 51.

Summarizing prior to the initiation of any half cycle of operation of the cutting arm, the cutting arm is in the lowered position. On the initiation of the half cycle of operation, spiral gear 79, cam 88, and bracket 85 begin immediately to rotate. However, no rotation of the cutting arm is then obtained since the extensions 105 are not engaged in the holes 104 to establish the friction drive for the disc 102, washer 103 and post 18.

When the cutting arm has been fully raised by the cam 88 then the friction drive is fully engaged and the cutting arm may be rotated through its half cycle of operation. When this rotation is in the inward direction towards recording, then the friction drive 105 is fully engaged and the cutting arm may be rotated through its half cycle of operation. When this rotation is in the inward direction towards recording, then the friction drive makes it possible to halt the cutting arm at the desired position just inward of the outer margin of the record, while nevertheless permitting the operating mechanism to complete its half cycle and then permit the cutting arm to be lowered at the end of the half cycle.

By a half-cycle of operation is meant the 180° operation of the cam which first raises the arm, rotates the arm in one direction and then lowers the arm.

Similarly, when the record cutting operation is completed, the initial operation of the operating mechanism again causes bracket 85 to rotate in an opposite direction even though the spiral gear 79 and cam 88 continue through the second half cycle to complete a full cycle.

Here also the outward rotation of the cutting arm does not begin until the cutting arm has been raised simultaneously engaging the friction clutch 102—103 only after the cutting arm has been fully raised. The cutting arm is now rotated out well beyond the turntable itself. A stop member may be used to prevent it from being rotated too far in which event the friction drive mechanism permits the operating mechanism to complete its second half cycle even though the cutting arm is stopped in its outward rotation by the stop 60.

The specific operation of switch 96 by pins 88*c* of cam 88 acting through switch actuators 97 and 98 will be described in connection with the description of the sequential operation of all elements of the automatic recorder.

*Playback arm and operating mechanism*

After the cutting arm is moved into the position shown in Figure 33 and the dotted line position of Figure 5 which actuates the switch 57, as will be pointed out below, to energize the motor 73 of operating mechanism 69 to move the cutting arm out from the position shown in Figure 33 to the position shown in Figures 1 and 34, the motor 73 of the pick-up arm operation mechanism 169 is energized.

Pick-up arm operating mechanism 169 is an exact duplicate of the operating mechanism 69 for the cutting arm mechanism and thus the same reference numbers have been applied thereto as to the operating mechanism 69 of the cutting arm already described, and the same description is applicable thereto. All of the parts previously described in connection with the operating mechanism 69 of the cutting arm function in the same manner as the operating mechanism 169 of the playback arm 20.

Thus, when the motor 73 of the pick-up arm 20 operating mechanism is energized, the small platform 94 at the end of arm 90 lifts the pin 95 at the lower end of post 21 of playback arm 20 and playback arm 20 is rotated clockwise with respect to Figures 1, 22 and 23 and counterclockwise with respect to Figures 33 to 36 to a position above the outer margin of the record.

Figure 18:
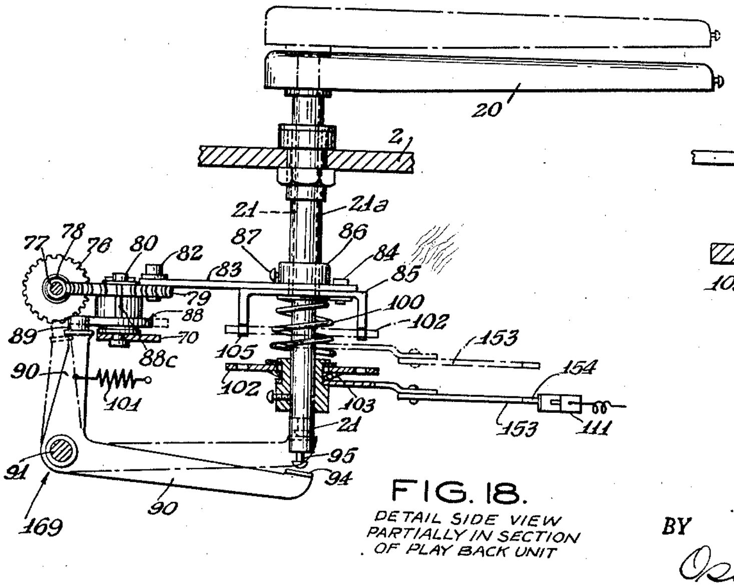
Figure 18 is a detailed side view of the playback unit.
Figure 17:
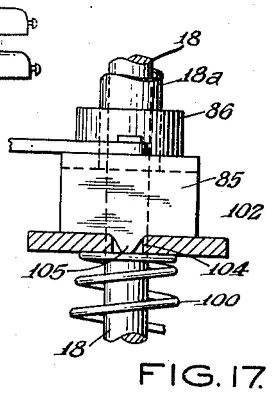
Figure 17 is a view partly in cross section taken on line 17—17 of Figure 15 looking in the direction of the arrows.

As the playback arm 20 is rotated toward the turntable the indexing arm 153 (Figures 6, 7, 18) thereof secured to the lower end of post 21 rotates therewith in the same direction.

Figure 6:
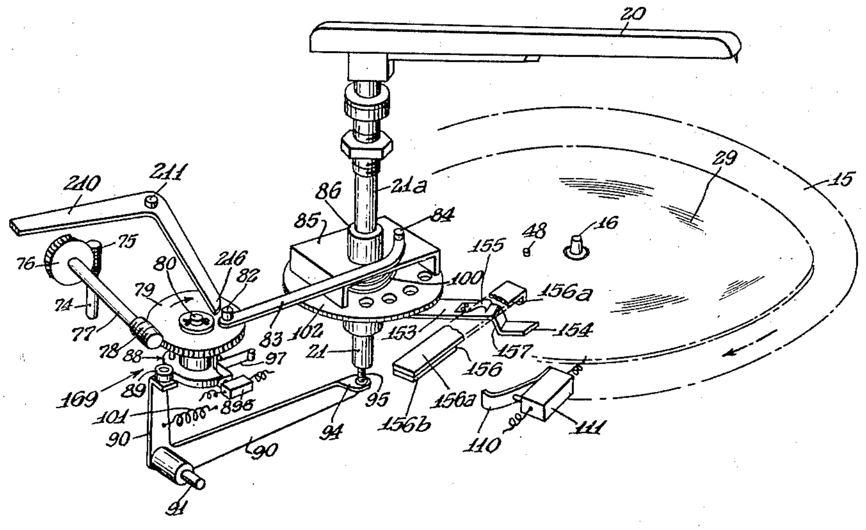
Figure 6 is a schematic view in perspective of the pick-up arm unit in the "at rest" position thereof.

The indexing arm 153 as seen particularly in Figure 6 carries the upwardly extended leaf spring member 155 secured thereto in any suitable manner, as by rivets. The leaf spring members 155 rides resiliently under the horizontal bracket 156*a*. When the pick-up arm 20 and its post 21 are elevated and moved from outside the turntable in towards the turntable and above the record on the turntable, the resilient stop member 155 on the indexing arm 153 is pressed upwardly against the under side of bracket 156*a* and the playback arm 20 and post 21 may now rotate inwardly until the resilient stop member 155 strikes against the abutment 156 on the under side of bracket 156*a*.

The playback arm 20 and its post 21 are thereby halted until the operating mechanism 169 completes its first half cycle of 180 whereupon the cam 88 permits the playback arm 20 and post 21 to be driven down by the compression spring 100 thereof, in the manner already described in connection with a similar operation in the cutting arm.

Figure 7:
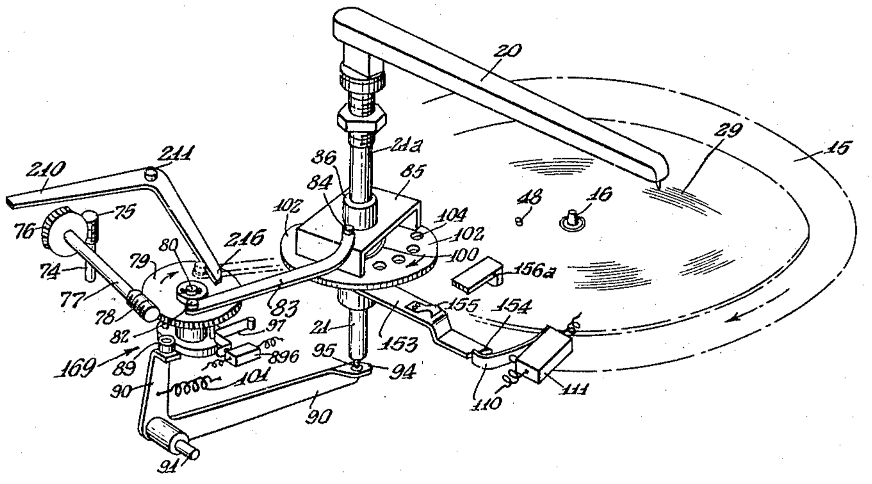
Figure 7 is a schematic view in perspective corresponding to that of Figure 6 illustrating the pick-up arm in the operative position.

During the continuation of the playback operation, the resilient stop member 155 now moves under the extended portion 156*b* of bracket 156*a* until the record is completed and the point 154 of the indexing arm 153 closes the switch 111 by engaging the switch actuator 110 as shown in Figure 7.

Closing of switch 111 through the stepping elements hereinafter described reactuates the motor 73 of operating mechanism 169 to operate through the second half cycle. The raising of pick-up arm 20 and post 21 at the beginning of the second second half cycle clears the point 154 from the switch actuator 110 so that these elements do not impede the return of the pick-up arm. The resilient stop member 155 is simply pressed up against the smooth under surface 156*b* of bracket 156*a* so that here too there is no impediment to the return of the pick-up arm. The pick-up arm is then swung out once more until the reentrant bend 157 of the indexing arm 153 strikes the side of bracket 156*a* as shown in Figure 6 whereupon the outward movement of the pick-up arm is halted at a point beyond the turntable and the pickup arm 20 and its post 21 are lowered on completion of the second half cycle.

Here again the operation of clutch plate 102, bracket 85, link 83, the friction washer 103 and other elements is exactly the same as that previously described in connection with the same elements as used for the cutting arm of Figures 4, 5, 14 and 15 and 17.

The means for interconnecting the cutting arm, playback arm and other elements of the mechanism will be described below on completion of the description of the specific subassemblies.

*Record loading mechanism*

The record loading mechanism comprises the record loading arm 26 mounted on and keyed to the post 27. The outer end of the record loading arm 26 has secured thereto a plate 32 to which is secured the spring gripper arms 31. Spring gripper arms 31 as seen in Figures 1, 3, 20, 43, 44 and especially Figure 50 are each made of spring metal secured in any suitable manner, as by rivets, to the plate 32 at the upper end and having the reentrant bend 250 at the lower end.

The reentrant bend 250 provides a ledge or surface which will grip and lift up the uppermost record 29 in the record stack 30. For this reason, the opening 28 in the back base plate 25 through which the top record 29 of the record stack 30 is visible is provided with three auxiliary openings or recesses 34 to provide clearance for the gripping ends 250 of the record grippers 31.

Figure 2:
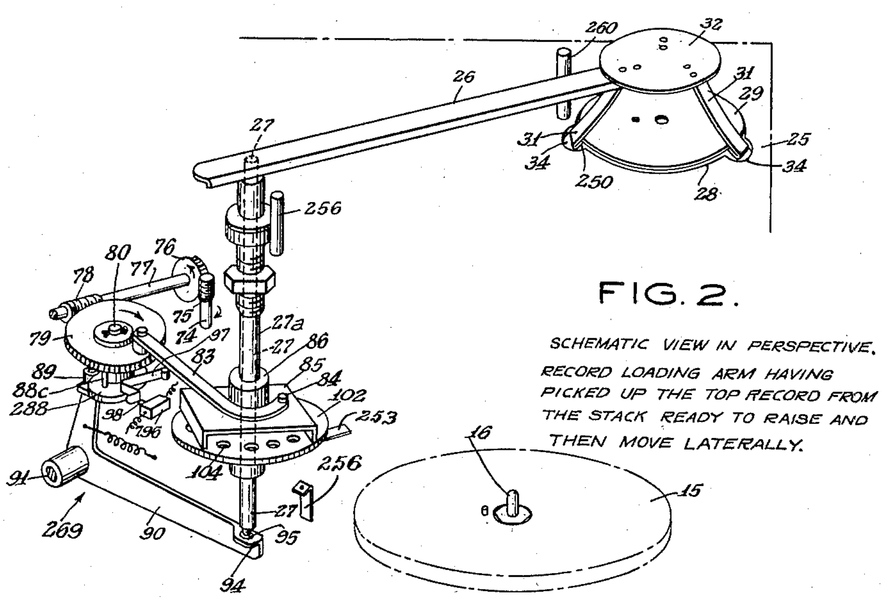
Figure 2 is a schematic view in perspective showing the record loading arm in the position it occupies just after having picked up the top record from the stack.
Figure 3:
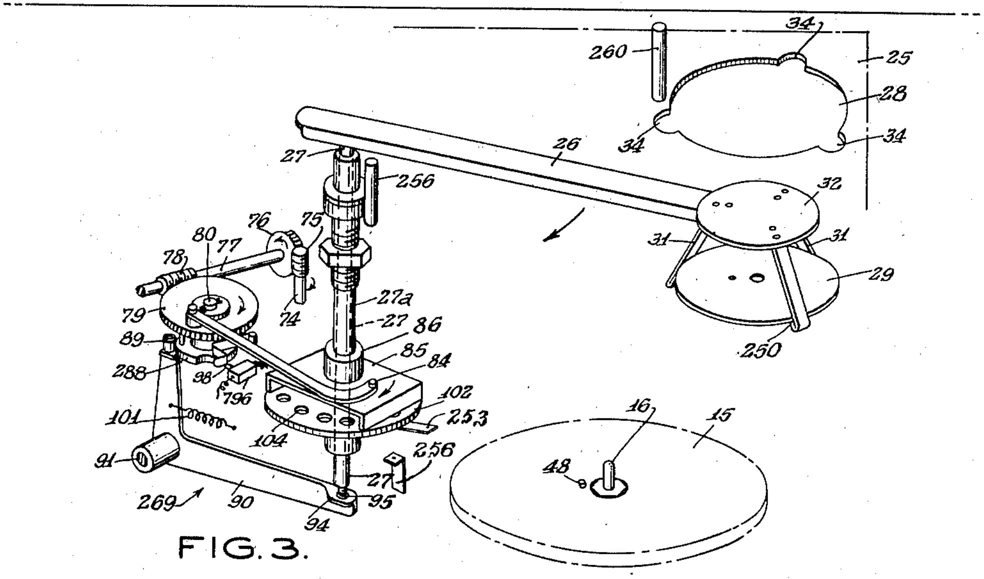
Figure 3 is a view in perspective corresponding to that of Figure 2 showing the record loading arm unit approaching the turntable with a record to be loaded thereon.
Figure 20:
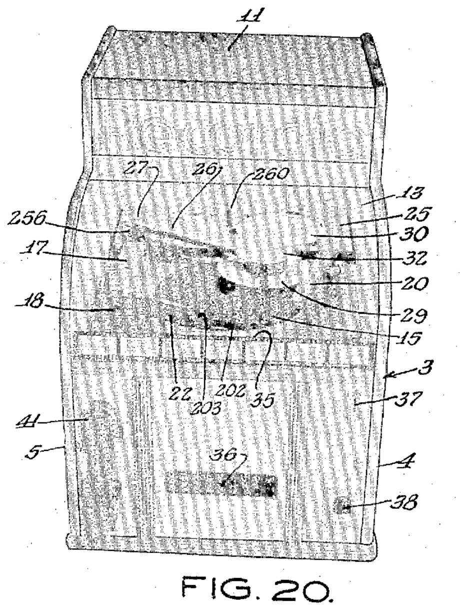
Figure 20 is a view of my novel recorder after a coin has been dropped into the slot and while the record placing arm is moving a record from the stack to the turntable.

The arm 26 is raised from the position shown in Figures 1, 2 and 19 and after it is raised, is swung through the position of Figures 3 and 20 to a position directly over the top of the turntable 15. As the record loading arm 26 rises, it lifts the top record 29 with it and carries it along. When the record loading arm 26 is directly over the turntable 15, it then drops down towards the turntable 15 and the central opening in record 29 is pushed down over the spindle 16.

The eccentric opening in record 29 does not necessarily at this time register with the eccentric pin 48 of turntable 15 although it is at the same radius as the said pin. The record loading arm 26 is lowered so that the ends 250 of the spring arms 31 are pushed down on the turntable as shown in Figures 43, 44 and 50. When thus pushed down, they are spread and since the record is centrally held by the spindle 16, the ends 250 of the spring arms 31 uniformly move out and away from the record 29 and are disengaged therefrom.

The record 29 now drops down a fraction of an inch and below the point where its edges would be reengaged by the detents at ends 250 of the spring arms 31 when the spring arms 31 rise once more. The record loading arm 26 is then raised and brought back to the position of Figures 1, 2 and 19.

It will here be obvious that any suitable form may be given to the spring arms 31 which will enable the spring arms 31 to be spread apart when pressed down on the turntable and any suitable holding means such as ledges, slots, notches and recesses may be used in place of the reentrant bends 250 at the lower ends of spring arms 31 to engage the record and to disengage the record when the spring arms are spread outwardly.

An important element in the construction is the placement of the detent notch, slot, recess or ledge at a small distance above the lowest end of each spring arm 31 so that when the spring arms 31 are spread apart by being pressed down on the turntable 15, the record will not only be released, but will be able to drop down a fraction of an inch so that it will not be reengaged by the ledges, detents, etc., as the record loading arm 26 is raised once more.

The operating mechanism 269 for the record loading arm 26 is identical in every respect with the operating mechanism 69 for the cutting arm and the operating mechanism 169 for the playback arm. The only difference occurs in the operation of the loading arm 26. Whereas in the cutting arm operating mechanism 69 and in the pick-up arm operating mechanism 169, the operation is halted at the end of a half cycle, to permit the pick-up arm and playback arm to traverse the record and is started once more for the second half cycle only after the pick-up arm or cutting arm has traversed the record, the record loading arm mechanism 269, however, goes through a full 360° cycle without an intermediate halt.

The record loading arm 26 is normally in the position shown in Figures 1, 2 and 19. Dropping of the coin into slot 37 (Figure 19) initiates, through a series of steps described below, the operation of the motor of operating mechanism 269 so that the motor begins to operate and rotate the operating elements of mechanism 269. Mechanism 269 as above pointed out is identical in construction to operating mechanism 69 and 169. The record loading arm 26 is first raised in a manner which is now well understood owing to the fact that platform 94 on the end of lever 90 raises the post 27 of record loading arm 26. When the post 27 and record loading arm 26 are fully raised, the clutch elements including clutch plate 102 and bracket 85 are fully engaged and the arm 26 is rotated to a position above the top of the turntable at which time the depressed portion of cam 288 moves opposite the follower 89 to lower the post 27 and record loading arm 26.

The record loading arm 26 may be adjusted with respect to the cam 288 so that it will be dropped exactly over the center of the turntable 15. However, a suitable stop 256 may be provided cooperating with the indexing arm 253 fixed to the post 27 to ensure that the record loading arm 26 will stop with the center opening of record 29 exactly over the spindle 16 of turntable 15.

As the arm 26 is lowered, the spring gripper arms 31 are spread as above described to drop the record. On continuing operation of the motor of operating mechanism 269, post 27 and record loading arm 26 are raised and rotated out once more to the initial position of Figures 2 and 19 where the record loading arm 26 and spring gripper arm 31 are stopped in registry with the record stack by the stop member 260.

On completion of the cycle of operation of the operating mechanism 269, the record loading arm 26 is lowered to a position where the ledges or detents 250 of spring gripper arms 31 engage the top record of the stack.

The cam 288 and pins 88*c* cooperate with switch 96 of the record loading mechanism (Figures 2 and 3) in the manner previously described in connection with the playback arm operating mechanism.

The sequence of operation will be described below in connection with the sequential description of all elements.

The clutch plate 102, bracket 85, spring washer 103 and other elements of the operating mechanism previously described are duplicated in the record loading arm operating mechanism 269.

*Record stacking*

The record stacking mechanism 300, Figures 1, 8, 9, 10 and 38 to 42 includes three posts, 301, 302, 303 secured at the top to the underside of back plate 25 and cross braced at the bottom by the triangular plate 305. The record stack supporting platform 306 is carried by the casing 310 of the record stack elevator mechanism 311 so that the platform 306 constitutes the floor of an elevator which carries the stack 30 of records.

The record stack is held even by reason of the fact that the posts 301, 302, and 303 are spaced apart by just sufficient distance to clear the diameter of the records in the stack. The operating mechanism 311 includes a drive motor 312 connected by the gear train 313 to the spiral gear 314 on shaft 315. The gear train 313 between the motor shaft 316 and shaft 315 is arranged to produce an extremely high gear reduction of the order of 100,000 to 1 so that the V-pulley 320 rotates at extremely slow speed.

V-pulley 321 on shaft 322 is driven at the same speed as V-pulley 320 by gear 323 which is engaged by gear 324 on shaft 315 of the pulley 320. The V-pulleys are positioned one lower than the other so that the weight of the motor, platform and records on one side produces a tight frictional engagement.

Figures 8, 9, 10:
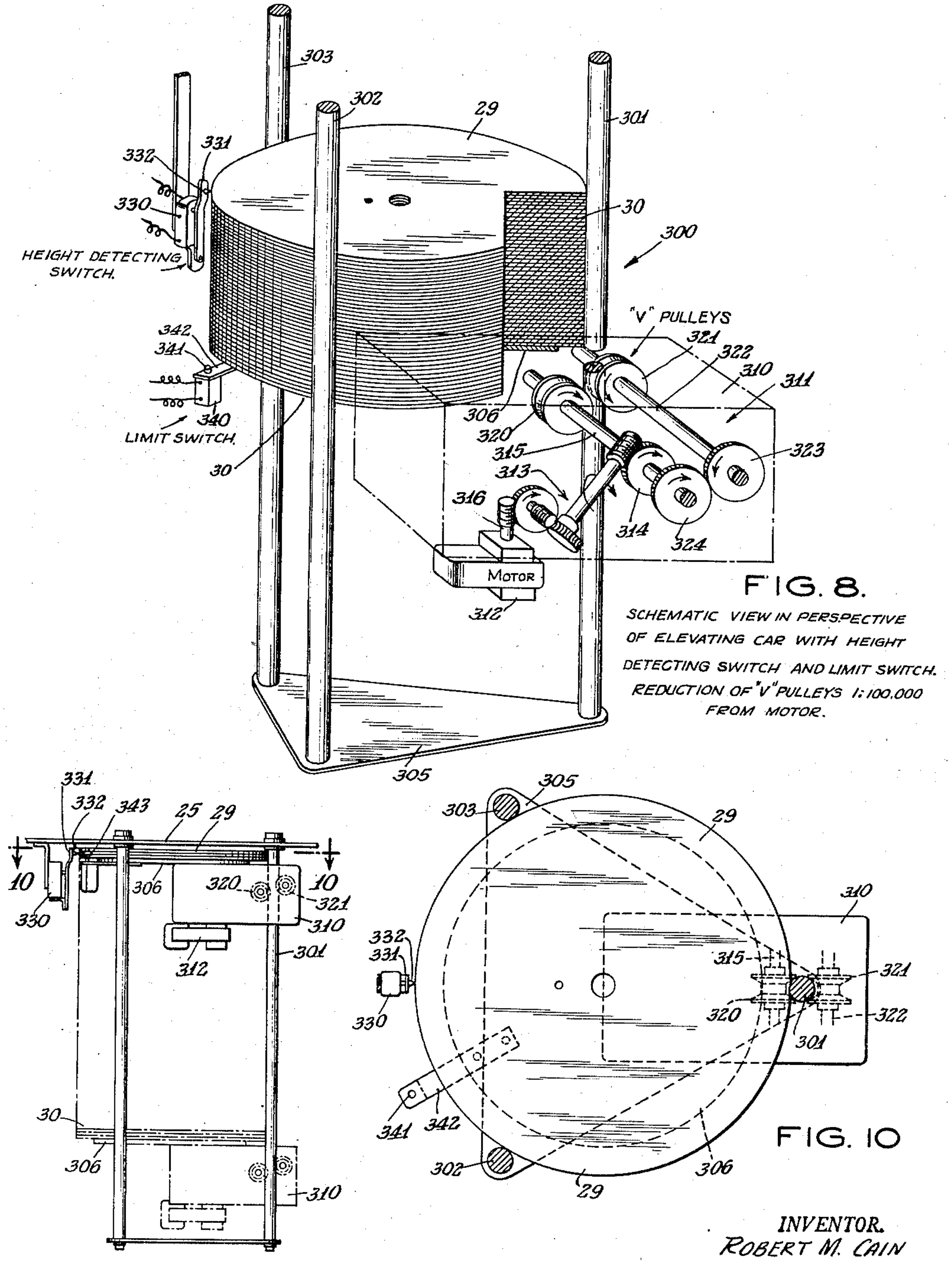
Figure 8 is a schematic view in perspective of the record stack and elevating mechanism.
Figure 9 is a side elevation of the record stack mechanism of Figure 8 showing the method of actuating the limit switch.
Figure 10 is a top view partly in cross section taken from lines 10—10 of Figure 9.

The motor and gear train is so arranged that the pulleys 320 and 321 rotate in a direction indicated by the arrows of Figure 8 to ride up the post 301. Consequently, whenever the motor 312 is energized, the pulleys 320 and 321 are operated to raise the casing 310 and the elevator platform 306 thereby raising the record stack 30.

The operation of motor 312 is controlled by the limit switch 330 mounted just beneath the plate 25 adjacent the opening 28 through which the top record 29 of the stack is visible. In the normal position of the limit switch 330, when its actuator 331 carrying the pin 332 is pressed towards the left with respect to Figure 9, the motor 312 is inoperable.

The actuator 331 is spring biased towards the right with respect to Figure 9 so that the pin 332 touches the top record 29 in the stack, which record thereby maintains the switch open. When the top record 29 of the stack is removed as shown in Figure 42, then the pin 332 moves to the right (see Figures 8 and 9) over the top of the stack 30 to permit the actuator 331 to resiliently move to the right to close the switch 330 to close the circuit to the motor 312.

The motor now operates to rotate the pulleys 320 and 321 to cause the elevator platform 306 and casing 310 to rise and lift the record stack to a position where the top record will press against the pin 332 to open the switch 330. Thus, as the records are removed from the top of the stack, the switch 330 is successively actuated to operate the motor 312 with the switch being opened every time the top record in the stack reaches the top position where it can be gripped by the spring gripper arms 31 of the record loading mechanism.

When the lowest record of the stack is finally removed, then further upward operation of the motor 312 and elevator platform 306 is halted by the limit switch 340 which is normally closed and which includes the switch actuator 341. The limit switch 340 is carried on the arm 342 extending from the elevator platform 306.

When the platform 306 reaches the uppermost position with all the records of stack 30 removed then actuator 341 is depressed by pin 343 on the under side of back plate 25 adjacent the opening 28 and switch 340 is opened. Switch 340 is in series with switch 330 and the motor 312 so that opening of switch 340 deenergizes the motor 312 and halts the further rise of the record elevator platform 306.

The underside of the record elevator mechanism is clearly seen in Figure 31. When it is desired to re-load the stack, the elevator platform 306 is rotated slightly clockwise with respect to Figure 8. This relieves the frictional engagement between the idlers and the post allowing the elevator to be lowered. The records are then loaded in from the top.

When the records are loaded, they are placed on a stack so that the lowest record is just below the top position so that switch 330 is closed to energize the motor 312 to raise the elevator platform 306 and record stack 30 until the top record 29 in the stack has reached the position where it can be engaged by gripper arms 31 in which position switch 330 is opened as above described.

*Record delivery mechanism*

At the end of the play back operation and as the pick-up arm 20 is being moved outwardly from the position of Figure 24 to the position of Figure 27, the record ejecting arm 22 having the outwardly bent plate 201 (Figures 1, 11, 12, 13 and 28) communicating with the vertical incline 202 is rotated on its post 23 from the position of Figures 11 and 23 through the positions of Figures 12, 24 and 25.

The turntable 15 is still rotating so that as the plate 22 moves in under the record 29 lifting up the edge of the record on the left side, the right side of the record is moved outwardly owing to clockwise rotation of the turntable.

The incline 202 of the ejecting arm 22 lifts the record off the spindle 16 so that the right side of the turntable can now spin the right side of the record towards the front of the cabinet because the left side of the record is held by the relatively stationary upper portion of the incline 202 of the ejecting arm 22.

This causes the record to spin out towards the front around the point 203 of Figures 12, 13 and 25 on arm 22 and is sufficient to eject the record through the slot 35 of Figure 28 as shown in Figures 13 and 26.

However, after the record has spun around to the front side of the ejecting arm 22, a spring hereinafter described provides a rapid return of the ejecting arm 22 back to the position of Figure 11 and assures a positive push on the trailing edge of the record thereby ensuring that it will be ejected.

Bell-crank lever 210 (Figures 1, 6, 7, 11 to 13 and 30 to 36) pivotally mounted at 211 (Figures 6 and 7) on the under side of base plate 2 is connected by the tie-rod 212 to the crank arm 213 on post 23 and extending below the base plate 2.

A spring 214 connected to the crank arm 213 biases the post 23 and the ejecting arm 22 to the positions shown in Figures 1 and 11. Further outward rotation of arm 22 and post 23 is prevented by the stop 216. Pin 82 of the playback arm operating mechanism engages end 217 (see Figure 7) of lever 210 as the outward movement of the playback arm is almost completed to rotate lever 210 counterclockwise with respect to Figure 7 to pull on rod 210. This actuates the rod 212 connected between end 220 of link 210 and crank 213 of ejecting plate 22 to rotate plate 22 as shown in Figures 11 to 13 and 24 and 25.

On completion of outward movement of pick-up arm 20, pin 82 clears end 217 of lever 210 so that spring 214 may now pull tie-rod 212, lever 210, crank 213 and ejecting plate 22 back to the original position, completing the ejecting of the record as shown in Figures 13 and 26. The elements of the ejecting mechanism are then positioned in the at-rest position of Figures 1 and 11 by the cooperation of spring 214 and the stop member 216 which resists further outward movement of the parts under the influence of spring 214.

*Operation of combined unit and integrating circuit*

From the foregoing, it will be obvious that each of the elements of my novel automatic recorder constitutes an individual subassembly which may readily be removed, re-aired, and replaced without interference with the other subassemblies and which may readily be phased and adjusted without necessarily requiring phasing and adjustment of other elements which are operating in perfect sequence.

However, although each of the individual assemblies for the record stack, record loading arm, recording arm, playback arm, record ejector and turntable are separate and individually replaceable, they are integrated and combined into a single phased sequentially operated unit by the various switches hereinbefore mentioned and by the various switches and circuits hereinbelow described.

In Figure 53, I have shown one form which the combining and integrating circuit may take in order properly to phase and sequentially operate each of the individual elements so that on depositing a coin, the elements operate in the proper manner to make, playback, and deliver a record.

The dropping of a coin in the coin chute results in energizing the basic circuit and after preliminary circuits are closed, causes arm 26 to operate as above disclosed to drop a record onto the turntable. At the same time, the record stack elevator rises so that the next record is ready for the record loading arm unit on the next operation.

On completion of the operation of the record loading arm unit, the turntable begins to turn and the recording arm is moved over and brought down to make a record. Appropriate warning or signal is given to the user to pick up the microphone and begin to talk. Near the end of the record, another signal is given to the user warning him that he has a specific limited time to complete the talk or song or other recording.

The recording arm is then removed from its engagement with the disc on the turntable and the playback arm is brought into registry with the disc on the turntable in order to play back the recording which has been made.

The unit may for convenience, in addition to having an ear piece on the telephone hand set which is used as a microphone, have a loud speaker. The loud speaker may be so connected that when the hand set is placed on the cradle, the loud speaker is energized, but when the hand set is lifted, it is de-energized and the ear piece is energized so that the person making the recording may listen in privacy.

On completion of the playback, the record ejecting mechanism removes the record from the turntable and delivers the record to the delivery slot. At the same time, the playback arm moves back away from its engagement with the turntable and all of the apparatus is brought to rest in preparation for the next operation. Thus, all of the elements are necessarily integrated.

In Figure 53 I have shown one arrangement of the various circuits in order to integrate the mechanism. Any convenient source of power may be used to be connected to the two-pronged plug 500.

When a coin is dropped in a slot 37 of the coin chute 700, it closes the switch 502.

A. *Testing the record stack height*

Current then flows from terminal 501 through switch 502 to connecting point 502*a*; then through conductor 503 to connecting point 504 of the double hold double throw switch 701, then through conductor 505 to connecting point 506; then through conductor 507 to connecting point 508; then by way of conductor 509 through the elevator switch 340 and the double throw elevator switch 330 to switch contact 512 then through conductor 513 to conductor 514 and connecting point 515; then through conductor 516 to the solenoid coil 517 in the coin chute 700; then through 518 to conductor 519, through connecting point 520 to conductor 521, through the connecting points 522 and 523 and conductor 523*a* to the first contact 524 of stepping switch bank No. 1 which has been given the reference number 702, through the switch arm 525 and bearing 526 of the switch arm 525 to conductor 527.

Current then flows to the connecting point 528 to conductor 529, connecting point 530, conductor 534, connecting point 535, conductor 536, connecting point 537 and back to the other side 538 of the power source.

For convenience in tracing the above circuit from terminal 501 through solenoid 517 and stepping switch contacts 524, the following summary of the foregoing description by reference number only is provided: 501—502—502*a*—503—504—505—506—507—508—509—340—330—512—513—514—515—516—517—518—519—520—521—522—523—523*a*—524—525—526—527—528—529—530—534—535—536—537—538.

At connecting point 530, a lead is taken to the central bearing 531 of switch arm 532 of the second bank 703 of the stepping switch and hence the switch arm 532 at the neutral or original position. However, switch arm 532 of bank 703 of the stepping switch engages contact 533 which is open circuited and hence no current flows through switch arm 532 in the original position.

If switch 330 is opened at contact 512 but engages contact 512*a* then the foregoing circuit is open and solenoid 517 cannot operate to effect the next operation. This occurs when the top record in the stack is not in the proper position to be engaged by the record loading arm; the circuit is then closed through contact 512*a* to the lifting motor 312 of the elevator stack. Current then flows from terminal 501 to conductor

509 as above outlined through switches 340 and 330 to contact 512*a*, then through elevator motor 321 conductors 601, 602, 603, point 604, conductors 605, 606, contact 607, switch arm 608, points and conductors 528, 529, 530, 534, 535, 536, 537 and back to terminal 538.

Obviously, if the proper record stack height is reached switch 330 is thrown back to contact 512 and solenoid 517 is energized. If there are no records on the platform, then switch 340 is opened thus opening the circuit both to the solenoid 517 and the elevator motor 312; the entire device can no longer function until the record platform is reloaded. Of course, as soon as a record is removed from the stack, switch 330 is thrown from contact 512 to contact 512*a* to energize motor 312 to lift the stack again. By this time, however, as below pointed out, the stepping switch has taken over control of the operation and switch 540 operated solenoid 517 is no longer needed.

Since the solenoid 517 of coin chute 700 is energized, clutch switch 540 is closed across its contacts 541 and 542 until the stepping switch is operated to the next control position as described below.

B. *Energizing the amplifier*

B1. *Energizing relay 707*

With the switch 502 closed, current now passes from terminal 501 through switch 502, point 502*a*, conductor 563, point 564, conductor 520, point 581, conductor 582 through the operating coil 583 of relay 707, conductor 584, point 523, conductor 523*a*, stepping switch point 524, stepping switch arm 525, stepping switch bearing 526, conductor 527, point 528, conductor 529, point 535, conductor 536, point 537 and back to the opposite side 538 of the terminal.

Here again the relay circuit may be expressed for conveniences as: 501—502—502*a*—563—564—580—581—582—583—584—523—523*a*—524—525—526—527—528—529—535—536—537—538.

B2. *Closing relay 707*

This closes the switch arm 586 across contacts 587 and 588 in relay 707. The amplifier 708 is thus energized, the current therefor flowing from terminal 501 through switch 502, point 502*a*, conductor 563, point 564, conductor 580, point 581, conductor 582 through switch contacts 588—586—587 to the amplifier socket 708; then back through conductor 590, point 591, conductor 592, point 537 and back to the opposite terminal 538. The amplifier is thus energized.

The amplifier energizing circuit may thus be traced 501—502—502*a*—563—564—580—588—587—708—590—592—537—538.

C. *Turning on the light*

On the closing of switch 502, the light 570 is switched on, being placed across the terminals 501 and 538, through switch 502, point 502*a*, conductor 563, point 564, conductor 565, point 566, conductor 567, point 568 in the signal light box 704, conductor 569 to the light 570; then through conductor 571 to point 572, conductor 573, point 535, conductor 536, point 537 and back to the other terminal 538.

This circuit is summarized: 502—502*a*—563—564—565—566—567—568—704—569—570—571—572—573—535—536—537—538.

D. *Operating the stepping switch for the first operation*

When the switch 502 is closed resulting in the closing of switch 540 in the manner above described, then the stepping switch solenoid 562 is energized to move the switch arms 525 and 532 to the next contacts 575 and 576 in the stepping switch banks I and II 702, 703.

The circuit for the stepping switch solenoid 562 is from terminal 501, through switch 502, point 502*a*, stepping switch solenoid 562, point 561, conductor 560, point 559, switch arm 558, point 557, conductor 556, point 555, conductor 554, point 553, conductor 552, point 551, conductor 550, point 549, conductor 548, point 547, conductor 546, conductor 545, closed switch 540, conductor 544, point 543, conductor 518, conductor 519, point 520, conductor 521, point 522, point 523, conductor 523*a*, stepping switch contact 524, stepping switch arm 525, stepping switch bearing 526, conductor 527, point 528, conductor 529, point 530, conductor 534, point 535, conductor 536, point 537 and back to the terminal 538. This circuit for the stepping switch solenoid may there be summarized: 501—502—502*a*—562—561 — 560 — 559 — 558 — 557 — 556 — 555 — 554 — 553 — 552 — 551 — 550 — 549 — 548 — 547 — 546 — 545 — 540 — 544 — 543 — 518 — 519 — 520 — 521 — 522 — 523 — 523*a* — 524 — 525 — 526 — 527 — 528 — 529 — 530 — 534 — 535—536—537—538.

E. *Record loading*

The energization of solenoid 562 causes stepping switch arms 525 (bank I—702) and 532 (bank II—703) to move respectively to contacts 575 and 576. The circuit for operating mechanism 269 for the record loading arm is now established from terminal 501 through switch 502, point 502*a* to conductor 503, point 504, arm 632 of the double pole double throw switch 701 to contact 631 then successively through points and conductor 630, 629, 628, 627, 626, 625, 624, 623, 622, 621 to the motor of record loading mechanism 269 then successively through points and conductors 620, 618, 616, 615, 614, 613, 612, 611, 610 to stepping switch contact 575, through the arm 525 of bank I of the stepping switch to the center bearing 526 of the arm, then through conductors and points 527, 528, 529, 530 and 531 to switch arm 532 of stepping switch bank II to stepping switch contact 576 then through conductor and points 634, 635, 636, 637, to the signal light 638, then at 639 to conductor 569 through light 570 and conductor and points 571, 572, 573, 535, 536, and 537 back to the other terminal 538.

E1. *Completion of record loading and operating stepping switch for the next operation*

On completion of the record loading operation switch 796 is momentarily closed to energize solenoid 562, then opened to release it and cause the stepping switch 702—703 to operate. Closing of switch 796 energizes solenoid 562 over the following circuit: Terminal 501, switch 502, point 502*a*, solenoid 562, points and conductors 560, 559, 558, 557, 556, 555, 554, 553, 552, 551, 550, 640 to point 796*a*, through switch 796 to switch contact 796*b*, to point 620, then through points and conductors 618, 616, 615, 614, 613, 612, 611, 610 to stepping switch contact 575, then through arm 525 and bearing 526 of the first bank 702 of the stepping switch, then through points and conductors 527, 528, 529, 530, 534, 535, 536, 537 to terminal 538.

F. *Record cutting operation*

By operation of solenoid 562, as above pointed out, the switches 702 and 703 are operated to a position where arms 525 and 532, respectively, engage contacts 645 and 646.

The cutter arm motor in operating mechanism 69 is now operated over the following circuit: From terminal 501 through switch 502, through points and conductors 502*a*, 503, 504, 632, 631, 630, 629, 628, 627, 626, 625, 624, 623, 622, 664, 663, 662 to operating motor of mechanism 69, then through points and conductors 661, 660, 659, 658, 657, 655, 654, 653, 652, 651, 650, 649, 648, and 647 to contact 645 of the first stepping switch bank 702, then through switch arm 525, bearing 526 and points and conductors 527, 528, 529, 530, 534, 535, 536 and 537 back to terminal 538.

At the same time, signal light 651 goes on to indicate that cutting is in progress. Light 651 is energized from terminal 501 through all of the elements above mentioned to point 530, then through bearing 531 of the second switch bank 703, arm 532, contact 646, points and conductors 647, 648, 649, and 650 to light 651, then through elements 652, 639, 568, 570, 571, 572, 573, 535, 536, 537 back to terminal 538.

G. *Turntable operation*

When the inward rotation of the cutter arm is completed, it moves down to engage the record as previously described. The limit switch 96 is operated at the conclusion of the inward movement to operate the stepping switch to the next set of contacts 800 to operate the turntable motor. Since solenoid 562 operates the stepping switch when released after having been energized, opening of switch 96 performs the stepping operation. Switch 96 is connected to operate solenoid 562 over the following circuit: Terminal 501, switch 502, point 502*a*, solenoid 562 and points and conductors 561, 560, 559, 558, 557, 556, 555, 554, 553, 552, 551, 550, 671, 670, 96*a*, switch 96, contact 96*b*, points and conductors 661, 660, 649, 648, 657, 656, 655, 654, 653, 652, 651, 650, 659, 658, 647, stepping switch contact 645, switch arm 525, points and conductors 526, 527, 528, 529, 530, 534, 535, 536, 537 to terminal 538.

This moves the stepping switch contact arms 526 and 532 to terminals 800 and 820, respectively, halts the cutting arm motor and starts the turntable motor.

The motor 720 for turntable 15 is now energized over the following circuit: Terminal 501, switch 502, points and conductors 502*a*, 503, 504, 632, 631, 630, 629, 628, 627, 626, 625, 624, 623, 622, 664, 663, 682, 681, 680, motor 720, points and conductors 685, 686, 687, 688, 689, 690, 691, 692, 693, 697, contact 800 of stepping switch bank I, 702, contact arm 525, bearing 526, points and conductors 527, 528, 529, 530, 534, 535, 536, 537 back to terminal 538. At point 530 a parallel circuit is taken to bearing 531 of stepping switch bank II, 703, contact arm 532, contact 820, points and conductors 821, 822, 823, 824 to signal light 825, then through points and conductors 826, 569, 570, 571, 572, 535, 536, 537 to terminal 538.

Also at point 824 a parallel circuit is taken through conductor 830 to counter 831 and points and conductors 826, 569, 570, 571, 572, 535, 536, 537 to terminal 538.

*H. Completion of record cutting*

As the cutting arm completes the record cutting operation, limit switch 57 is closed. This energizes and then de-energizes stepping switch solenoid 562 to operate the stepping switch banks I and II once more to contacts 840 and 841, respectively. The circuit connections between solenoid 562 and switch 57 are: Terminal 501, switch 502, solenoid 562, points and conductors 561, 560, 559, 558, 556, 555, 814, 813, 812, 811, 810, 809, 808, 807, 806, 805, 804, 803, contact 57*b*, switch 57, points and conductors 801, 802, 686, 687, 688, 689, 690, 691, 692, 693, contact 800 of stepping switch bank I, 702, contact arm 525, points and conductors 526, 527, 528, 529, 530, 534, 535, 536, 537, to terminal 538.

This moves contact arm 525 to contact 840. Contact 840 is in parallel with contact 645 over conductor 842 and thus the cutting arm operating motor is operated once more over the same circuit as that previously described in connection with contact 645 to return the cutting arm through the operating mechanism 69 to its original position. Switch 96 is closed as the cutting arm begins to move back acting through contact 840 over the same circuit as previously described in connection with contact 645 to energize the solenoid 562 and operating the stepping switch to the next contacts 850, 851 when opened once more. The turntable motor 720 is de-energized since contact 800 is disconnected by the movement of contact arms 525 and 532 away from contacts 800 and 820; it will be re-energized when the playback arm engages the turntable. The entire record cutting cycle is thus completed.

*I. Warning of approaching end of record cutting operation*

As the record cutter nears the end of its inward stroke, it closes switch 860 which turns on light 861 as a warning that the record is almost finished and that the operator should bring his remarks or song to a close. The circuit through switch 860 and light 861 is from terminal 501, switch 502, points and conductors 502*a*, 563, 564, 565, 566, 567, 568 to light 861, then through points and conductors 866, 865, 864, 863, 862 to switch 860, then through points and conductors 868, 687, 688, 689, 690, 691, 692, 693, 697, stepping switch contact 800, switch arm 525, then through points and conductors 526, 527, 528, 529, 530, 534, 535, 536, 537, to terminal 538.

*J. Operation of playback arm to playing position*

When contacts 850 and 851 of the stepping switch are now engaged, the playback arm operating mechanism motor in mechanism 169 is energized over the following circuit: From terminal 501, switch 502, points and conductors 502*a*, 503, 504, 632, 631, 630, 629, 628, 627, 626, 625, 624, 623, 870 to motor of operating mechanism 169, then through points and conductors 871, 872, 873, 874, 875, 876 to contact 850 of stepping switch bank I, 702, switch arm 525 and points and conductors 526, 527, 528, 529, 530, 534, 535, 536, 537 to terminal 538.

Signal light 883 is then put on in parallel with the above circuit from point 530, to switch arm 532 of stepping switch bank II, 703 to contact 851, conductor 880, point 881, conductor 882, signal light 883, conductors and points 569, 570, 571, 572, 535, 536, 537 to terminal 538.

*K. Turntable operation for playback*

Switch 896 of mechanism 169 is closed when mechanism 169 begins to operate and is opened when the playback arm is brought into playing position. The closing of switch 896 energizes solenoid 562 and the opening of switch de-energizes solenoid 562 to step the stepping switch to the next contacts 900 and 901.

Solenoid 562 is energized when switch 896 is closed over the following circuit: From terminal 501, switch 502 to solenoid 562, through points and conductors 561, 560, 559, 558, 557, 556, 555, 554, 553, 552, 551, 550, 549, 548 to switch 896, then through points and conductors 871, 872, 873, 874, 875, 876, 850, 525, 526, 527, 528, 529, 530, 534, 535, 536, 537 to terminal 538.

When contacts 900 and 901 of stepping switch banks I and II, 702, 703 are engaged by switch arms 525 and 532, the turntable motor 720 is energized through contact 900 over the same circuit previously described therefor through contact 800 with which contact 900 is in parallel over conductors and points 693, 692, 691, 903, 904. When the turntable is working through contact 900, the signal light 910 which indicates that the playback operation is now going on is energized in parallel through point 530 bearing 531 of stepping switch bank II, 703, switch arm 532, contact 901, conductor 911, points and conductors 912, 913, 914 to light 910, conductors and points 569, 570, 571, 572, 573, 535, 536, 537 to terminal 538.

*L. Completion of turntable operation for playback and return of playback arm*

When playback is completed, the playback arm closes switch 110 to energize solenoid 562 and then moves past switch 110 to de-energize solenoid 562 to move stepping switch arms 525 and 532 to contacts 920 and 921. Closing of switch 110 energizes solenoid 562 over the following circuit: From terminal 501, switch 502, solenoid 562, points and conductors 561, 560, 559, 558, 557, 556, 555, 814, 813, 812, 811, 810, 809, 808, 807, 806, 805, 804, 932, 931, 932*a*, to switch 110, then through points and conductors 921, 922, 923, 924, 912, 913, 914, 910, 568, 569, 570, 571, 572, 535, 536, 537 to terminal 538.

When contact 920 is engaged, the motor of playback mechanism 169 is energized over the same circuit as it was previously energized when contact 850 was engaged since contacts 850 and 920 are in parallel over conductor 930. The playback arm is then returned. Switch 896 is closed to energize the solenoid over the same circuit previously described which included contact 850. When switch 896 is opened on completion of the outward movement of the playback arm, the solenoid 562 is de-energized to move the stepping switch arms 525 and 532 back to the original contacts 524 and 533.

The turntable motor should stay on during the return stroke of the playback arm to permit the record ejecting mechanism previously described to operate. Hence, stepping switch contact 921 which is in parallel with contacts 900 and 800 which previously energized the turntable motor (over conductor 935) carries the current through switch arm 532 to point 530 and back to terminal 538 to keep the turntable motor on until the return stroke of the playback arm is completed.

*M. Function control and test*

It is desirable when servicing the machine to be able to move the stepping switch readily to any desired position and then to test the specific operation at that position.

For this purpose, the double pole double throw switch 701 is provided which may be moved to the test position in which switch arm 632 engages contact 981 and switch arm 558 engages contact 982.

With switch 502 closed, the closing of the stepper control switch 960 will close the circuit to the stepping switch solenoid 562 over the following path: Through terminal 501, switch 502, solenoid 562, points and conductors 561, 560, 559, 558, 982, stepping control switch 960, conductor 985, 592 back to terminal 538.

Thus, every time switch 960 is pressed, the stepping switch will be moved one step. The serviceman need not, therefore, wait for the entire operation to be completed or for all preliminary operations to be completed before testing any one phase of the operation.

The proper phasing of the operation may be tested when the double pole double throw switch 701 is thrown to the test position by the arrangement which causes all of the circuits through solenoid 562 to pass from point 555 in the double pole double throw switch assembly 701 through conductor 970 and neon bulb 980 to the solenoid 562.

Thus, every time the solenoid 562 is energized the neon bulb 980 will go on when the double pole double throw switch 701 is in the test position. Every time the solenoid is de-energized to throw the stepping switch to the next position, the neon bulb 980 will go off.

After the solenoid 562 has operated the stepping switch under the control of the switch button 960 to the right position, then all of the circuits for operating the various elements, including the operating cutters for record loading, cutter arm control and playback arm pass through the function control test switch 990 and conductor 991 to contact 981 of switch 701 to terminal 501.

Consequently, the switch button 990 which is spring biased open must be held closed by the serviceman to permit the particular function to operate.

Thus, the serviceman when testing a particular phase of the operation will throw the stepping switch by continually pressing button 960 until the right phase is reached and then will press switch button 990 to cause that phase of the operation to continue with the neon bulb 930 going on as the solenoid stepping member is energized.

The moment the neon bulb 980 goes off, this will show that the solenoid has been de-energized to move the stepping switch to the next operation, and the serviceman will instantly release the switch 990 at the instant neon bulb 980 goes off. He then observes visually whether the particular phase thus tested (whether record loading, record cutting or playback) is in the right position for the termination of its particular operation and may readily adjust the element to the right position.

Thus, a simplified and readily operable testing mechanism is provided which will save the serviceman a substantial amount of time in testing the desired phase of the operation and will indicate to the serviceman immediately which particular portion of the operation requires adjustment.

In the foregoing, I have described my invention solely in connection with preferred illustrative embodiment thereof. Since many variations and modifications of my invention will now be obvious to those skilled in the art, I prefer to be bound not by the specific disclosures herein contained but only by the appended claims.

I claim:

1. In an automatic phonograph, a horizontal turntable and a horizontal arm, a pivot for said arm located outside the turntable, said pivot comprising a vertical post, said post being rotatable and being also slidable vertically; operating mechanism for said arm; said operating mechanism including a connection to said post for rotating the post and another connection to said post for raising and lowering said post; the end of said arm remote from said post, moving over the turntable on rotation of the post in one direction and said end of said arm moving away from said turntable on rotation of said post in the opposite direction; said operating mechanism including a rotatable driving member; said post having a rotatable driven member rotatably mounted thereon, a link connected between said driving and driven members eccentrically of each of said members; and additional connection between said driving member and said post operable to raise said post while said driving member is moving through a predetermined angular position and means connecting said driven member and said post when said post is raised to cause said post to rotate; said last mentioned means including a frictional element between the driven member and an element secured to said post.

2. In an automatic phonograph, a horizontal turntable and a horizontal arm, a pivot for said arm located outside the turntable, said pivot comprising a vertical post, said post being rotatable and being also slidable vertically; operating mechanism for said arm; said operating mechanism including a connection to said post for rotating the post and another connection to said post for raising and lowering said post; the end of said arm remote from said post, moving over the turntable on rotation of the post in one direction and said end of said arm moving away from said turntable on rotation of said post in the opposite direction; said operating mechanism including a rotatable driving member; said post having a rotatable driven member rotatably mounted thereon, a link connected between said driving and driven members eccentrically of each of said members; and additional connection between said driving member and said post operable to raise said post while said driving member is moving through a predetermined angular position and means connecting said driven member and said post when said post is raised to cause said post to rotate; said last mentioned means including a frictional element between the driven member and an element secured to said post; and means for halting said post at a predetermined position while said driving and driven members continue to rotate.

3. In an automatic phonograph, a horizontal turntable and a horizontal arm, a pivot for said arm located outside the turntable, said pivot comprising a vertical post, said post being rotatable and being also slidable vertically; operating mechanism for said arm; said operating mechanism including a connection to said post for rotating the post and another connection to said post for raising and lowering said post; the end of said arm remote rom said post, moving over the turntable on rotation of the post in one direction and said end of said arm moving away from said turntable on rotation of said post in the opposite direction; said operating mechanism including a rotatable driving member; said post having a rotatable driven member rotatably mounted thereon, a link connected between said driving and driven members eccentrically of each of said members; and additional connection between said driving member and said post operable to raise said post while said driving member is moving through a predetermined angular position; said additional connection comprising a cam connected to and driven by said driving member, a lever bearing upwardly against said post and bearing against said cam; said lever being rotatably mounted; elements on said cam for rotating said lever to raise said post, and further elements on said cam to permit the weight of the post and arm to lower the same and rotate the lever back; and means connecting said driven member and said post when said post is raised to cause said post to rotate; said last mentioned means including a frictional element between the driven member and an element secured to said post.

4. In an automatic phonograph, a horizontal turntable and a horizontal arm, a pivot for said arm located outside the turntable, said pivot comprsing a vertical post, said post being rotatable and being also slidable vertically; operating mechanism for said arm; said operating mechanism including a connection to said post for rotating the post and another connection to said post for raising and lowering said post; the end of said arm remote from said post, moving over the turntable on rotation of the post in one direction and said end of said arm moving away from said turntable on rotation of said post in the opposite direction; said operating mechanism including a rotatable driving member; said post having a rotatable driven member rotatably mounted thereon, a link connected between said driving and driven members eccentrically of each of said members; and additional connection between said driving member and said post operable to raise said post while said driving member is moving through a predetermined angular position; said additional connection comprising a cam connected to and driven by said drving member, a lever bearing upwardly against said post and bearing against said cam; said lever being rotatably mounted; elements on said cam for rotating said lever to raise said post, and further elements on said cam to permit the weight of the post and arm to lower the same and rotate the lever back; and means connecting said driven member and said post when said post is raised to cause said post to rotate; said last mentioned means including a frictional element between the driven member and an element secured to said post; and means for halting said post at a predetermined position while said driving and driven members continue to rotate.

5. In an automatic phonograph, a horizontal turntable and a horizontal arm, a pivot for said arm located outside the turntable, said pivot comprising a vertical post, said post being rotatable and being also slidable vertically; operating mechanism for said arm; said operating mechanism including a connection to said post for rotating the post and another connection to said post for raising and lowering said post; the end of said arm remote from said post, moving over the turntable on rotation of the post in one direction and said end of said arm moving away from said turntable on rotation of said post in the opposite direction; said operating mechanism including a rotatable driving member; said post having a rotatable driven member rotatably mounted thereon, a link connected between said driving and driven members eccentrically on each of said members; and additional connection between said driving member and said post operable to raise said post while said driving member is moving through a predetermined angular position; said additional connection comprising a cam connected to and driven by said driving member, a lever bearing upwardly against said post and bearing against said cam; said lever being rotatably mounted; elements on said cam for rotataing said lever to raise said post, and further elements on said cam to permit the weight of the post and arm to lower the same and rotate the lever back; and means connecting said driven member and said post when said post is raised to cause said post to rotate; said last mentioned means including a frictional element between the driven member and an element secured to said post; and means for halting said post at a predetermined position while said driving and driven members continue to rotate said last mentioned further elements on said cam being spaced 180° apart; said halting means being effective to halt the arm prior to the completion of a 180° half-cycle of said post and arm.

6. In an automatic phonograph, a horizontal turntable and a horizontal arm, a pivot for said arm located outside the turntable, said pivot comprising a vertical post, said post being rotatable and being also slidable vertically; operating mechanism for said arm; said operating mechanism including a connection to said post for rotating the post and another connection to said post for raising and lowering said post; the end of said arm remote from said post, moving over the turntable on rotation of the post in one direction and said end of said arm moving away from said turntable on rotation of said post in the opposite direction; said operating mechanism including a rotatable driving member; said post having a rotatable driven member rotatably mounted thereon, a link connected between said driving and driven members eccentrically on each of said members; and additional connection between said driving member and said post operable to raise said post while said driving member is moving through a predetermined angular position; said additional connection comprising a cam connected to and driven by said driving member, a lever bearing upwardly against said post and bearing against said cam; said lever being rotatably mounted; elements on said cam for rotating said lever to raise said post, and further elements on said cam to permit the weight of the post and arm to lower the same and rotate the lever back; and means connecting said driven member and said post when said post is raised to cause said post to rotate; said last mentioned means including a frictional element between the driven member and an element secured to said post; and means for halting said post at a predetermined position while said driving and driven members continue to rotate; said last mentioned further elements on said cam being spaced 180° apart; said halting means being effective to halt the arm prior to the completion of a 180° half-cycle of said post and arm; said link connection between said driving and driven members causing the sense of rotation of said driven member to be reversed at the end of each 180° half-cycle of said driven member.

7. In an automatic phonograph, a horizontal turntable and a horizontal arm, a pivot for said arm located outside the turntable, said pivot comprising a vertical post, said post being rotatable and being also slidable vertically; operating mechanism for said arm; said operating mechanism including a connection to said post for rotating the post and another connection to said post for raising and lowering said post; the end of said arm remote from said post, moving over the turntable on rotation of the post in one direction and said end of said arm moving away from said turntable on rotation of said post in the opposite direction; said operating mechanism including a rotatable driving member; said post having a rotatable driven member rotatably mounted thereon, a link connected between said driving and driven members eccentrically on each of said members; and additional connection between said driving member and said post operable to raise said post while said driving member is moving through a predetermined angular position; said additional connection comprising a cam connected to and driven by said driving member, a lever bearing upwardly against said post and bearing against said cam; said lever being rotatably mounted; elements on said cam for rotating said lever to raise said post, and further elements on said cam to permit the weight of the post and arm to lower the same and rotate the lever back; and means connecting said driven member and said post when said post is raised to cause said post to rotate; said last mentioned means including a frictional element between the driven member and an element secured to said post; and means for halting said post at a predetermined position while said driving and driven members continue to rotate; said last mentioned further elements on said cam being spaced 180° apart; said halting means being effective to halt the arm prior to the completion of a 180° half-cycle of said post and arm; said link connection between said driving and driven members causing the sense of rotation of said driven member to be reversed at the end of each 180° half-cycle of said driven member; and switch means operable by said driving member in accordance with the angular position thereof controlling the rotation of said horizontal turntable.

8. In an automatic phonograph, a horizontal turntable and a horizontal arm, a pivot for said arm located outside the turntable, said pivot comprising a vertical post, said post being rotatable and being also slidable vertically; operating mechanism for said arm; said operating mechanism including a connection to said post for rotating the post and another connection to said post for raising and lowering said post; the end of said arm remote from said post, moving over the turntable on rotation of the post in one direction and said end arm moving away from said turntable on rotation of said post in the opposite direction; said operating mechanism including a rotatable driving member; said post having a rotatable driven member rotatably mounted thereon, a link connected between said driving and driven members eccentrically on each of said members; and additional connection between said driving member and said post operable to raise said post while said driving member is moving through a predetermined angular position; said additional connection comprising a cam connected to and driven by said driving member, a lever bearing upwardly against said post and bearing against said cam; said lever being rotatably mounted; elements on said cam for rotating said lever to raise said post, and further elements on said cam to permit the weight of the post and arm to lower the same and rotate the lever back; and means connecting said driven member and said post when said post is raised to cause said post to rotate; said last mentioned means including a frictional element between the driven member and an element secured to said post; and means for halting said post at a predetermined position while said driving and driven members continue to rotate; said last mentioned further elements on said cam being spaced 180° apart; said halting means being effective to halt the arm prior to the completion of a 180° half-cycle of said post and arm; said link connection between said driving and driven members causing the sense of rotation of said driven member to be reversed at the end of each 180° half-cycle of said driven member; and switch means operable by said driving member in accordance with the angular position thereof, additional switch operating members on said post; and switch means located in the path of movement of said switch operating members and operable thereby controlling the rotation of said horizontal turntable.

9. An automatic phonograph as in claim 6, wherein the horizontal arm comprises a record loading arm; means at the end of the arm remote from the pivot releasably mechanically engageable with a record disc; means for supporting a stack of records outside the turntable; said arm being moveable over said stack and toward said stack to engage the top record in said stack and over said turntable and toward said turntable to deposit the record on said turntable.

10. An automatic phonograph as in claim 7 wherein the horizontal arm comprises a record loading arm; means at the end of the arm remote from the pivot releasably mechanically engageable with a record disc; means for supporting a stack of records outside the turntable; said arm being movable over said stack and toward said stack to engage the top record in said stack and over said turntable and toward said turntable to deposit the record on said turntable.

11. An automatic phonograph as in claim 6 wherein the horizontal arm comprises a record cutting arm having a cutting stylus located at the end of the arm remote from the pivot point thereof; said arm being movable over the turntable and down toward the turntable to cause the cutting stylus to engage a record disc on the turntable; means for driving the cutting arm across the turntable to cause the cutting stylus to cut a spiral groove in the record disc; said cutting arm being movable up from said turntable and away from said turntable when a groove is cut.

12. An automatic phonograph as in claim 7 wherein the horizontal arm comprises a record cutting arm having a cutting stylus located at the end of the arm remote from the pivot point thereof; said arm being movable over the turntable and down toward the turntable to cause the cutting stylus to engage a record disk on the turntable; means for driving the cutting arm across the turntable to cause the cutting stylus to cut a spiral groove in the record disk; said cutting arm being movable up from said turntable and away from said turntable when a groove is cut.

13. An automatic phonograph as in claim 6 wherein the horizontal arm comprises a playback arm having a playback stylus at the end of the arm remote from the pivot thereof; said arm being movable over the turntable and down toward the turntable to cause the playback stylus to engage the groove of a grooved disk on said turntable; said playback stylus and arm being movable across said disk; said playback arm being thereafter movable up from said turntable and away from said turntable.

14. An automatic phonograph as in claim 7 wherein the horizontal arm comprises a playback arm having a playback stylus at the end of the arm remote from the pivot thereof; said arm being movable over the turntable and down toward the turntable to cause the playback stylus to engage the groove of a grooved disk on said turntable; said playback stylus and arm being movable across said disk; said playback arm being thereafter movable up from said turntable and away from said turntable.

15. An automatic phonograph as in claim 6 wherein three horizontal arms are provided each having an independent operating mechanism as in said claim and in which the first arm comprises a record loading arm, the second arm comprises a record cutting arm, and the third arm comprises a record playback arm; said arms being sequentially operated.

16. An automatic phonograph as in claim 7 wherein three horizontal arms are provided each having an independent operating mechanism as in said claim and in which the first arm comprises a record loading arm, the second arm comprises a record cutting arm, and the third arm comprises a record playback arm; said arms being sequentially operated.

17. An automatic phonograph as in claim 7 wherein three horizontal arms are provided, each having an independent operating mechanism as in said claim and in which the first arm comprises a record loading arm, the second arm comprises a record cutting arm, and the third arm comprises a record playback arm; and means operable by each of the arms for sequentially initiating the operation of the next arm.

18. Combined automatic recording and playback mechanism comprising a rotatable horizontal turntable; a stack of records adjacent the turntable and sequentially operated record loading arm, recording arm and playback arm, each of said arms extending horizontally in planes parallel to said turntable and above said turntable; each of said arms being rotatable in a horizontal plane from a position away from said turntable to a position over said turntable; and each of said arms being movable vertically; operating mechanism individual to each of said arms; each of said individual operating mechanism being substantially identical and interchangeable, electrical actuating means for each of said operating mechanism; and circuit connections including switching means for energizing said electrical actuating means in predetermined order; said switching means being actuated to close appropriate circuit connections in accordance with the position of the various arms and operating mechanism therefor; and additional circuit connections for operating each of said arms, said circuit connections including a common manually operated switch for energizing the actuating means for each arm.

19. Combined automatic recording and playback mechanism comprising a rotatable horizontal turntable; a stack of records adjacent the turntable and sequentially operated record loading arm, recording arm and playback arm, each of said arms extending horizontally in planes parallel to said turntable and above said turntable; each of said arms being rotatable in a horizontal plane from a position away from said turntable to a position over said turntable; and each of said arms being movable vertically; operating mechanism individual to each of said arms; each of said individual operating mechanism being substantially identical and interchangeable, electrical actuating means for each of said operating mechanism; and circuit connections including switching means for energizing said electrical actuating means in predetermined order; said switching means being actuated to close appropriate circuit connections in accordance with the position of the various arms and operating mechanism therefor; and additional circuit connections for operating each of said arms, said circuit connections including a common manually operated switch for energizing the actuating means for each arm; a stepping switch; solenoid means for operating said stepping switch; said solenoid being prepared for operation upon energization thereof and operating said stepping switch upon de-energization thereof.

20. Combined automatic recording and playback mechanism comprising a rotatable horizontal turntable; a stack of records adjacent the turntable and sequentially operated record loading arm, recording arm and playback arm, each of said arms extending horizontally in planes parallel to said turntable and above said turntable; each of said arms being rotatable in a horizontal plane from a position away from said turntable to a position over said turntable; and each of said arms being movable vertically; operating mechanism individual to each of said arms; each of said individual operating mechanism being substantially identical and interchangeable, electrical actuating means for each of said operating mechanism; and circuit connections including switching means for energizing said electrical actuating means in predetermined order; said switching means being actuated to close approprate circuit connections in accordance with the position of the various arms and operating mechanism therefor; and additional circuit connections for operating each of said arms, said circuit connections including a common manually operated switch for energizing the actuating means for each arm; a stepping switch; solenoid means for operating said stepping switch; said solenoid being prepared for operation upon energization thereof and operating said stepping switch upon de-energization thereof; and additional circuit connections for energizing said solenoid including an additional manually operated switch means for moving said stepping switch to selected positions.

21. Combined automatic recording and playback mechanism comprising a rotatable horizontal turntable; a stack of records adjacent the turntable and sequentially operated record loading arm, recording arm and playback arm, each of said arms extending horizontally in planes parallel to said turntable and above said turntable; each of said arms being rotatable in a horizontal plane from a position away from said turntable to a position over said turntable; and each of said arms being movable vertically; operating mechanism individual to each of said arms; each of said individual operating mechanism being substantially identical and interchangeable, .electrical actuating means for each of said operating mechanism; and circuit connections including switching means for energizing said electrical actuating means in predetermined order; said switching means being actuated to close appropriate circuit connections in accordance with the position of the various arms and operating mechanism therefor; and additional circuit connections for operating each of said arms, said circuit connections including a common manually operated switch for energizing the actuating means for each arm; a stepping switch; solenoid means for operating said stepping switch; said solenoid being prepared for operation upon energization thereof and operating said stepping switch upon de-energization thereof; and means in circuit with said solenoid and said manually operated common switch for the actuating means for indicating the de-energization of the solenoid.

22. Combined automatic recording and playback mechanism comprising a rotatable horizontal turntable; a stack of records adjacent the turntable and sequentially operated record loading arm, recording arm and playback arm, each of said arms extending horizontally in planes parallel to said turntable and above said turntable; each of said arms being rotatable in a horizontal plane from a position away from said turntable to a position over said turntable; and each of said arms being movable vertically; operating mechanism individual to each of said arms; each of said individual operating mechanism being substantially identical and interchangeable, electrical actuating means for each of said operating mechanism; and circuit connections including switching means for energizing said electrical actuating means in predetermined order; said switching means being actuated to close appropriate circuit connections in accordance with the position of the various arms and operating mechanism therefor; and additional circuit connections for operating each of said arms, said circuit connections including a common manually operated switch for energizing the actuating means for each arm; solenoid means for operating said stepping switch; said solenoid being prepared for operation upon energization thereof and operating said stepping switch upon de-energization thereof; and means in circuit with said solenoid and said manually operated common switch for the actuating means for indicating the de-energization of the solenoid; and the operation of the stepping switch in response to such de-energization.

23. Combined automatic recording and playback mechanism comprising a rotatable horizontal turntable; a stack of records adjacent the turntable and sequentially operated record load-arm, recording arm and playback arm, each of said arms extending horizontally in planes parallel to said turntable and above said turntable; each of said arms being rotatable in a horizontal plane from a position away from said turntable to a position over said turntable; and each of said arms being movable vertically; operating mechanism individual to each of said arms; each of said individual operating mechanism being substantially identical and interchangeable, electrical actuating means for each of said operating mechanism; and circuit connections including switching means for energizing said electrical actuating means in predetermined order; said switching means being actuated to close appropriate circuit connections in accordance with the position of the various arms and operating mechanism therefor; and additional circuit connections for operating each of said arms, said circuit connections including a common manually operated switch for energizing the actuating means for each arm; solenoid means for operating said stepping switch; said solenoid being prepared for operation upon energization thereof and operating said stepping switch upon de-energization thereof; and a neon bulb in circuit with said solenoid and said manually operated common switch for the actuating means for indicating the de-energization of the solenoid.

ROBERT M. CAIN.

REFERENCES CITED

The following references are of record in the file of this patent:

UNITED STATES PATENTS

| Number | Name | Date |
|---|---|---|
| 1,289,584 | Weser | Dec. 31, 1918 |
| 1,312,461 | Wadsworth | Aug. 5, 1919 |
| 1,456,614 | Behlen | May 29, 1923 |
| 1,679,054 | Seabolt | July 31, 1928 |
| 1,979,276 | Mann | Nov. 6, 1934 |
| 2,129,612 | White | Sept. 6, 1938 |
| 2,169,854 | Stephenson | Aug. 15, 1939 |
| 2,191,214 | Lannerd | Feb. 20, 1940 |
| 2,293,723 | Erickson | Aug. 25, 1942 |
| 2,340,147 | Shively et al. | Jan. 25, 1944 |
| 2,342,411 | Lissiansky | Feb. 22, 1944 |
| 2,437,557 | Rockola et al. | Mar. 9, 1948 |
| 2,509,811 | Dale | May 30, 1950 |

FOREIGN PATENTS

| Number | Country | Date |
|---|---|---|
| 312,196 | Great Britain | May 21, 1929 |
| 480,024 | Great Britain | Feb. 16, 1938 |